United States Patent
Petrov

(10) Patent No.: US 8,982,927 B2
(45) Date of Patent: Mar. 17, 2015

(54) TRANSMITTING METHOD, RECEIVING METHOD, TRANSMITTER AND RECEIVER

(71) Applicant: Panasonic Corporation, Osaka (JP)

(72) Inventor: Mihail Petrov, Dresden (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/352,088

(22) PCT Filed: Nov. 7, 2012

(86) PCT No.: PCT/JP2012/007137
§ 371 (c)(1),
(2) Date: Apr. 16, 2014

(87) PCT Pub. No.: WO2013/069272
PCT Pub. Date: May 16, 2013

(65) Prior Publication Data
US 2014/0269960 A1    Sep. 18, 2014

(30) Foreign Application Priority Data

Nov. 10, 2011 (EP) ..................................... 11188627
Nov. 25, 2011 (EP) ..................................... 11190793

(51) Int. Cl.
*H04B 1/00*     (2006.01)
*H04B 7/06*     (2006.01)
(Continued)

(52) U.S. Cl.
CPC ............. *H04B 7/06* (2013.01); *H04L 27/3444* (2013.01); *H04L 1/0042* (2013.01); *H04L 27/345* (2013.01)
USPC ............ 375/146; 375/267; 375/299; 714/752

(58) Field of Classification Search
USPC ......... 375/140, 141, 146, 260, 267, 295, 299; 714/746, 752, 776
See application file for complete search history.

(56) References Cited

U.S. PATENT DOCUMENTS 7,158,579 B2 * 1/2007 Hottinen ........................ 375/267
8,630,223 B2 * 1/2014 Yang et al. ..................... 370/316
(Continued)

FOREIGN PATENT DOCUMENTS

DE    10 2009 030 676    12/2010
EP    1 667 349    6/2006
(Continued)

OTHER PUBLICATIONS

International Search Report issued Jan. 22, 2013 in International (PCT) Application No. PCT/JP2012/007137.
(Continued)

*Primary Examiner* — Dac Ha
(74) *Attorney, Agent, or Firm* — Wenderoth, Lind & Ponack, L.L.P.

(57) ABSTRACT

D-dimensional vectors that each have D real-valued symbols as elements are converted into D-dimensional rotated vectors that each have D real symbols as elements. The conversion is performed by multiplying each of the D-dimensional vectors by a D×D orthogonal matrix. A complex symbol sequence including $N_C=N_S/2$ complex symbols is generated from $N_S$ real symbols. The complex symbol sequence is generated such that the distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

16 Claims, 25 Drawing Sheets

(51) Int. Cl.
*H04L 27/34* (2006.01)
*H04L 1/00* (2006.01)

(56) References Cited

U.S. PATENT DOCUMENTS

| | | | | |
|---|---|---|---|---|
| 8,644,407 | B2* | 2/2014 | Qu | 375/267 |
| 2014/0056330 | A1* | 2/2014 | Petrov | 375/135 |

FOREIGN PATENT DOCUMENTS

| | | |
|---|---|---|
| EP | 2 288 048 | 2/2011 |
| JP | 2011-515040 | 5/2011 |
| WO | 2009/069622 | 6/2009 |
| WO | 2009/103746 | 8/2009 |
| WO | 2010/143861 | 12/2010 |
| WO | 2011/010180 | 1/2011 |

OTHER PUBLICATIONS

European Search Report issued May 23, 2012 in European Application 11188627.1.
European Search Report issued May 31, 2012 in European Application 11190793.7.
ETSI EN 302 755 V1.1.1, Digital Video Broadcasting (DVB); Frame structure channel coding and modulation for a second generation digital terrestrial television broadcasting system (DVB-T2), Sep. 2009, pp. 19, 46-55.
Charbel Abdel Nour et al., Rotated QAM Constellations to Improve BICM Performance for DVB-T2, IEEE 10th International Symposium on Spread Spectrum Techniques and Applications (ISSSTA'08), 2008, pp. 354-359.
ETSI EN 300 744 V1.6.1 (Jan. 2009).
Mikel Mendicute, Iker Sobron, Lorena Martinez and Pello Ochandiano: "DVB-T2:New Signal Processing Algorithms for a Challenging Digital Video Broadcasting Standard", University of Mondragon Digital Video, Floriano da Rango, Feb. 1, 2010, pp. 185-206, XP002675633, Retrieved from the Internet: URL: http://cdn.intechopen.com/pdfs/8519/InTech_Dvb_t2_new_signal_processing_algorithms_for_a_challenging_digital_video_broadcasting_standard.pdf [retrieved on May 9, 2012] *section 2, 3 and 7.*.
Wu Zhanji et al: "A novel Joint-Coding-Modulation-Diversity OFDM system", Mobile Congress (GMC), 2010 Global, IEEE, Piscataway, NJ, USA, Oct. 18, 2010, pp. 1-6, XP031800622, ISBN: 978-1-4244-9001-1 *section II*.
Rui Ye et al: "Design of Multiple Turbo-Coded modulation diversity", Communications, Circuits and Systems, 2008. ICCCAS 2008. International Conference on, IEEE, Piscataway NJ, USA, May 25, 2008, pp. 105-108, XP031352888, DOI: 10.1109/ICCCAS.2008. 4657738 ISBN: 978-1-4244-2063-6 *section II. B and II. C. *.

* cited by examiner

Frame

Frame

Frame

Frame 1  Frame 2

FIG.3A
2D-RC
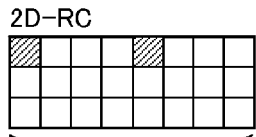
Frame
4D-RC
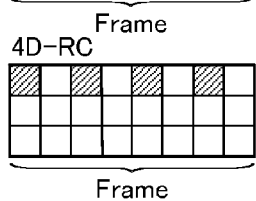
Frame
FIG.3B
2D-RC
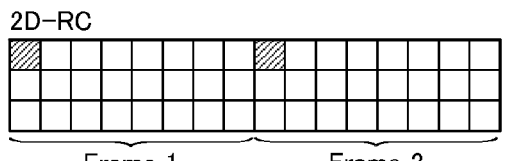
Frame 1　　　Frame 2
4D-RC
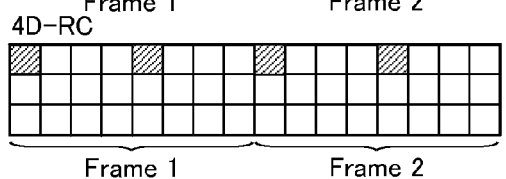
Frame 1　　　Frame 2
FIG.3C
2D-RC
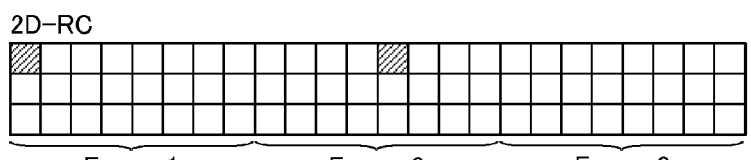
Frame 1　　Frame 2　　Frame 3
4D-RC
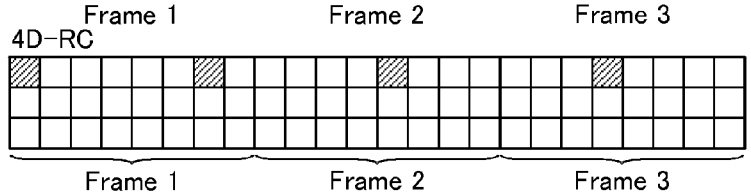
Frame 1　　Frame 2　　Frame 3
FIG.3D
2D-RC
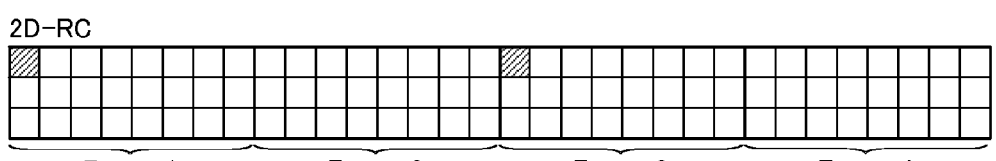
Frame 1　　Frame 2　　Frame 3　　Frame 4
4D-RC
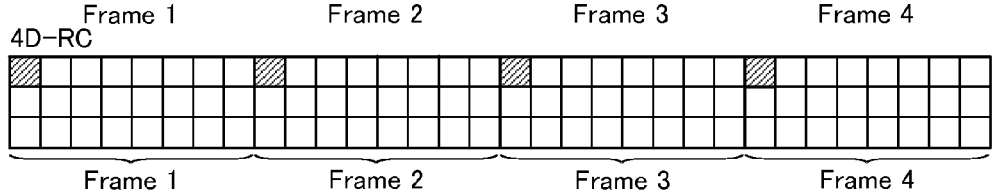
Frame 1　　Frame 2　　Frame 3　　Frame 4

Initial 2D-RC component mapping

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
|---|---|---|---|---|---|---|---|---|----|----|----|----|----|----|----|----|----|----|----|----|----|----|----|----|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Im |

(b)

Delay with period 24

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
|---|---|---|---|---|---|---|---|---|----|----|----|----|----|----|----|----|----|----|----|----|----|----|----|----|
| 24 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | Im |

⎵ Period (c)

Delay with period 8

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
|---|---|---|---|---|---|---|---|---|----|----|----|----|----|----|----|----|----|----|----|----|----|----|----|----|
| 8 | 1 | 2 | 3 | 4 | 5 | 6 | 7 | 16 | 9 | 10 | 11 | 12 | 13 | 14 | 15 | 24 | 17 | 18 | 19 | 20 | 21 | 22 | 23 | Im |

Period      Period      Period (d)

Delay with period 4

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
|---|---|---|---|---|---|---|---|---|----|----|----|----|----|----|----|----|----|----|----|----|----|----|----|----|
| 4 | 1 | 2 | 3 | 8 | 5 | 6 | 7 | 12 | 9 | 10 | 11 | 16 | 13 | 14 | 15 | 20 | 17 | 18 | 19 | 24 | 21 | 22 | 23 | Im |

Period  Period  Period  Period  Period  Period (e)

Delay with period 2

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
|---|---|---|---|---|---|---|---|---|----|----|----|----|----|----|----|----|----|----|----|----|----|----|----|----|
| 2 | 1 | 4 | 3 | 6 | 5 | 8 | 7 | 10 | 9 | 12 | 11 | 14 | 13 | 16 | 15 | 18 | 17 | 20 | 19 | 22 | 21 | 24 | 23 | Im |

Period Period Period Period Period Period Period Period Period Period Period Period

FIG.6

(a)
Initial 4D-RC component mapping

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Im |

(b)
Delay with period 24

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 12 | 12 | 1 | 1 | 2 | 2 | 3 | 3 | 4 | 4 | 5 | 5 | 6 | 6 | 7 | 7 | 8 | 8 | 9 | 9 | 10 | 10 | 11 | 11 | Im |

Period (c)
Delay with period 8

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 4 | 4 | 1 | 1 | 2 | 2 | 3 | 3 | 8 | 8 | 5 | 5 | 6 | 6 | 7 | 7 | 12 | 12 | 9 | 9 | 10 | 10 | 11 | 11 | Im |

Period     Period     Period (d)
Delay with period 4

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 2 | 2 | 1 | 1 | 4 | 4 | 3 | 3 | 6 | 6 | 5 | 5 | 8 | 8 | 7 | 7 | 10 | 10 | 9 | 9 | 12 | 12 | 11 | 11 | Im |

Period  Period  Period  Period  Period  Period

FIG.7

2D-RC component mapping

| 1 | 1 | 3 | 3 | 5 | 5 | 7 | 7 | 9 | 9 | 11 | 11 | 13 | 13 | 15 | 15 | 17 | 17 | 19 | 19 | 21 | 21 | 23 | 23 | Re |
|---|---|---|---|---|---|---|---|---|---|----|----|----|----|----|----|----|----|----|----|----|----|----|----|----|
| 2 | 2 | 4 | 4 | 6 | 6 | 8 | 8 |10 |10 | 12 | 12 | 14 | 14 | 16 | 16 | 18 | 18 | 20 | 20 | 22 | 22 | 24 | 24 | Im |

Pair1 Pair2 Pair3 Pair4 Pair5 Pair6 Pair7 Pair8 Pair9 Pair10 Pair11 Pair12

FIG.8

4D-RC component mapping

| 1 | 1 | 1 | 1 | 3 | 3 | 3 | 3 | 5 | 5 | 5 | 5 | 7 | 7 | 7 | 7 | 9 | 9 | 9 | 9 | 11 | 11 | 11 | 11 | Re |
|---|---|---|---|---|---|---|---|---|---|---|---|---|---|---|---|---|---|---|---|----|----|----|----|----|
| 2 | 2 | 2 | 2 | 4 | 4 | 4 | 4 | 6 | 6 | 6 | 6 | 8 | 8 | 8 | 8 |10 |10 |10 |10 | 12 | 12 | 12 | 12 | Im |

Pair1  Pair2  Pair3  Pair4  Pair5  Pair6

FIG.9
(a) Write in 2D-RC
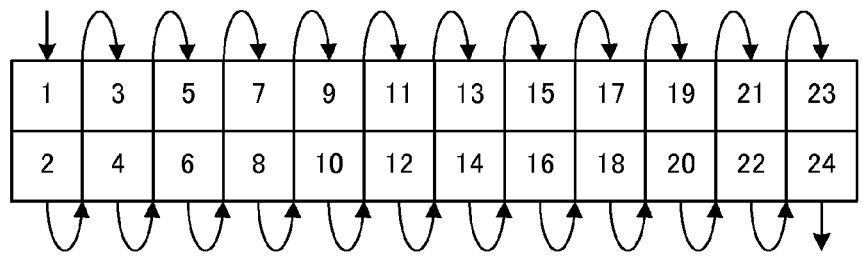
(b) Read in 2D-RC
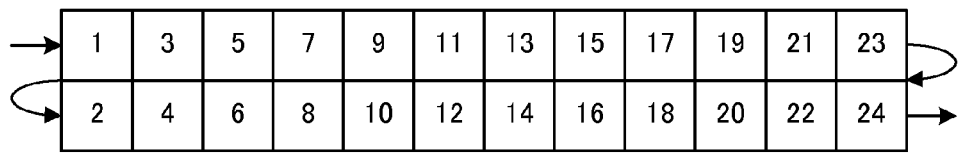
FIG.10
(a) Write in 4D-RC
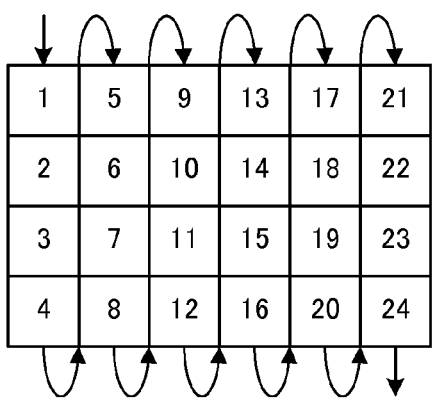
(b) Read in 4D-RC
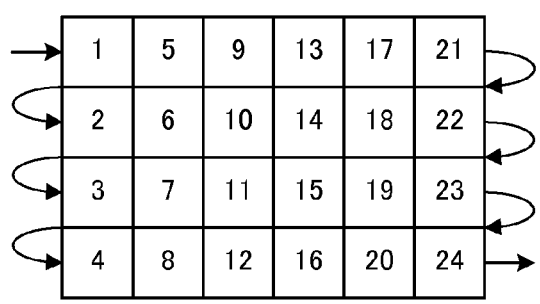

| 1 | 3 | 5 | 7 | 9 | 11 | 13 | 15 | 17 | 19 | 21 | 23 | 2 | 4 | 6 | 8 | 10 | 12 | 14 | 16 | 18 | 20 | 22 | 24 |
| 24 | 2 | 4 | 6 | 8 | 10 | 12 | 14 | 16 | 18 | 20 | 22 | 1 | 3 | 5 | 7 | 9 | 11 | 13 | 15 | 17 | 19 | 21 | 23 |

Permuted FEC block (b)

| 1 | 3 | 5 | 7 | 9 | 11 | 13 | 15 | 17 | 19 | 21 | 23 |
| 24 | 2 | 4 | 6 | 8 | 10 | 12 | 14 | 16 | 18 | 20 | 22 |

| 2 | 4 | 6 | 8 | 10 | 12 | 14 | 16 | 18 | 20 | 22 | 24 |
| 1 | 3 | 5 | 7 | 9 | 11 | 13 | 15 | 17 | 19 | 21 | 23 |

Frame 1      Frame 2

(c)

| 1 | 3 | 5 | 7 | 9 | 11 | 13 | 15 |
| 24 | 2 | 4 | 6 | 8 | 10 | 12 | 14 |

| 17 | 19 | 21 | 23 | 2 | 4 | 6 | 8 |
| 16 | 18 | 20 | 22 | 1 | 3 | 5 | 7 |

| 10 | 12 | 14 | 16 | 18 | 20 | 22 | 24 |
| 9 | 11 | 13 | 15 | 17 | 19 | 21 | 23 |

Frame 1      Frame 2      Frame 3

(d)

| 1 | 3 | 5 | 7 | 9 | 11 |
| 24 | 2 | 4 | 6 | 8 | 10 |

| 13 | 15 | 17 | 19 | 21 | 23 |
| 12 | 14 | 16 | 18 | 20 | 22 |

| 2 | 4 | 6 | 8 | 10 | 12 |
| 1 | 3 | 5 | 7 | 9 | 11 |

| 14 | 16 | 18 | 20 | 22 | 24 |
| 13 | 15 | 17 | 19 | 21 | 23 |

Frame 1      Frame 2      Frame 3      Frame 4

(a) Initial QAM complex cells

| | | | | | | | | | | | | | | | | | | | | | | | | |
|---|---|---|---|---|---|---|---|---|---|---|---|---|---|---|---|---|---|---|---|---|---|---|---|---|
| | | | | | | | | | | | | | | | | | | | | | | | | Re |
| | | | | | | | | | | | | | | | | | | | | | | | | Im |

(b) Initial 2D-RC component mapping (two components jointly encoded)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Im |

(c) Imaginary component delay with one complex cell

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Re |
| 24 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | Im |

FIG.21

(a) Initial QAM complex cells

| | | | | | | | | | | | | | | | | | | | | | | | | |
|---|---|---|---|---|---|---|---|---|---|---|---|---|---|---|---|---|---|---|---|---|---|---|---|---|
| | | | | | | | | | | | | | | | | | | | | | | | | Re |
| | | | | | | | | | | | | | | | | | | | | | | | | Im |

(b) Initial 4D-RC component mapping (four components jointly encoded)

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Im |

(c) Imaginary component delay with two complex cells

| 1 | 1 | 2 | 2 | 3 | 3 | 4 | 4 | 5 | 5 | 6 | 6 | 7 | 7 | 8 | 8 | 9 | 9 | 10 | 10 | 11 | 11 | 12 | 12 | Re |
| 12 | 12 | 1 | 1 | 2 | 2 | 3 | 3 | 4 | 4 | 5 | 5 | 6 | 6 | 7 | 7 | 8 | 8 | 9 | 9 | 10 | 10 | 11 | 11 | Im |

QPSK Bit Order :
$y_{0,q}, y_{1,q}$

QPSK  Re{z} conveys bit $y_{0,q}$
Im{z} conveys bit $y_{1,q}$

16-QAM Bit Order :
$y_{0,q}, y_{1,q}, y_{2,q}, y_{3,q}$

Re{z} conveys bits $y_{0,q}$ and $y_{2,q}$
Im{z} conveys bits $y_{1,q}$ and $y_{3,q}$

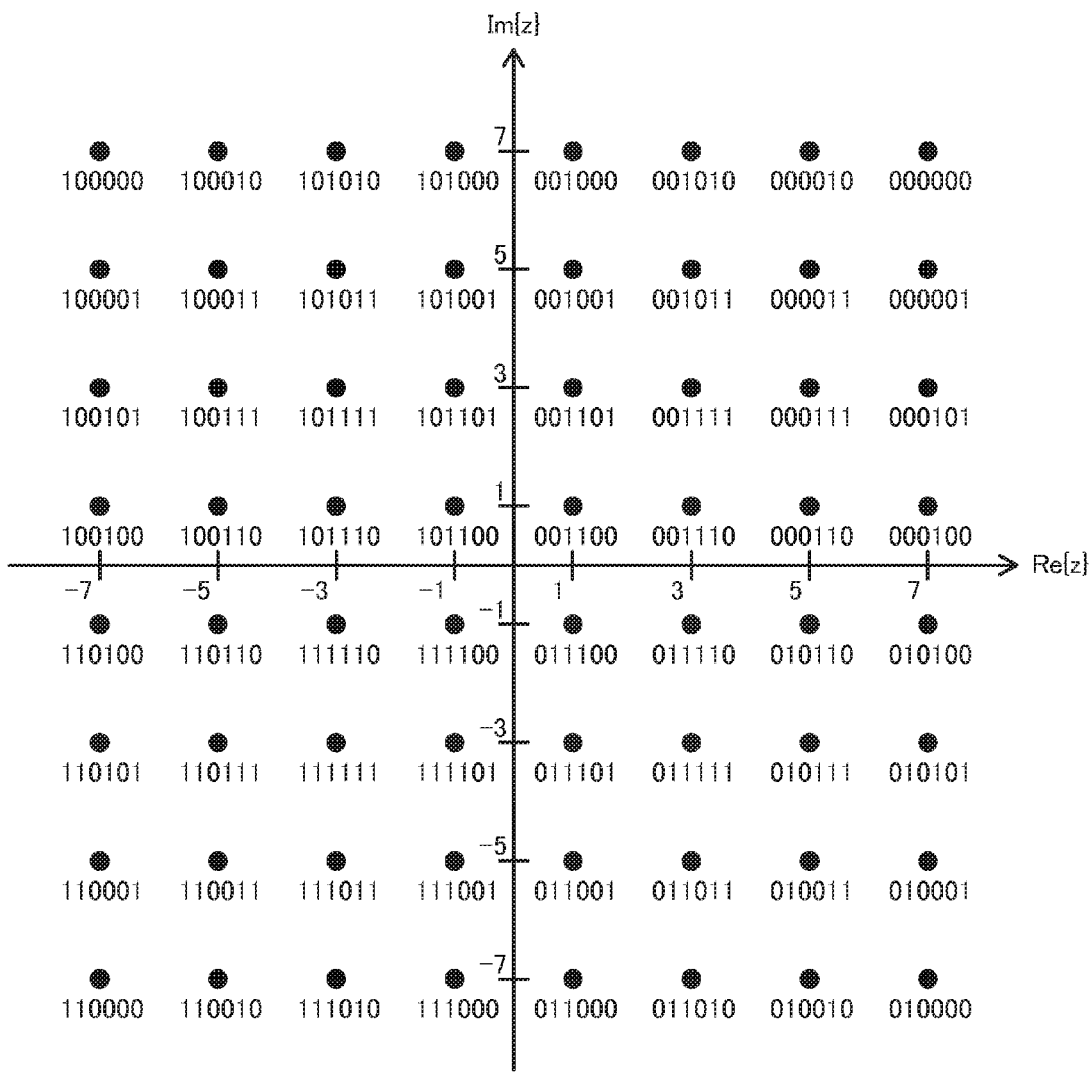

TRANSMITTING METHOD, RECEIVING METHOD, TRANSMITTER AND RECEIVER

TECHNICAL FIELD

The present invention relates to the field of digital communications, and more specifically to the technology for transmission and reception employing multi-dimensional rotated constellations.

BACKGROUND ART

In recent years, there have been transmitters that use multi-dimensional rotated constellations (e.g., rotated quadrature amplitude modulation (QAM) constellations) (see Patent Literature 1 and Non-Patent Literature 1, for example).

Such a transmitter has a function of multiplying each of vectors by an orthogonal matrix (rotating each of vectors), each of the vectors having, as elements thereof, a predetermined number of real-valued pulse amplitude modulation (PAM) symbols output from a symbol mapper. In such a transmitter, the predetermined number of elements of each vector resulting from the rotation process (i.e., each rotated vector) are spread along the time axis.

CITATION LIST

Patent Literature

[Patent Literature 1]
European Patent Application Publication No. 2288048

Non-Patent Literature

[Non-Patent Literature 1]
ETSI EN 302 755 V1.1.1 (DVB-T2 Standard)

SUMMARY OF INVENTION

Technical Problem

Time diversity relies on the spreading of the predetermined number of elements of each rotated vector along the time axis.

Accordingly, an object of the present invention is to provide a transmission method that achieves excellent time diversity by appropriately spreading the predetermined number of elements of each rotated vector along the time axis.

Solution to Problem

To achieve the above-described object, the present invention provides a transmission method for transmitting digital data, comprising: encoding a block of data of a predetermined length with an error correction code; generating a real-valued symbol sequence including $N_S$ real-valued symbols by mapping the encoded block of data onto real-valued symbols a predetermined number of bits at a time; converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and generating a complex symbol sequence from $N_S$ real symbols resulting from the conversion, the complex symbol sequence including $N_C = N_S/2$ complex symbols, wherein the complex symbol sequence is generated such that a distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

Advantageous Effects of Invention

The transmission method described above achieves excellent time diversity.

BRIEF DESCRIPTION OF DRAWINGS

FIG. 3A schematically shows an example of spreading a FEC block over one frame according to an embodiment of the present invention.

FIG. 3B schematically shows an example of spreading a FEC block over two frames according to an embodiment of the present invention.

FIG. 3C schematically shows an example of spreading a FEC block over three frames according to an embodiment of the present invention.

FIG. 3D schematically shows an example of spreading a FEC block over four frames according to an embodiment of the present invention.

FIG. 5 shows an example of cell mapping performed by a cell mapper 140A shown in FIG. 4 for two-dimensional rotated constellation blocks.

FIG. 6 shows an example of cell mapping performed by the cell mapper 140A shown in FIG. 4 for four-dimensional rotated constellation blocks.

FIG. 7 shows another example of cell mapping performed by the cell mapper 140A shown in FIG. 4 for two-dimensional rotated constellation blocks.

FIG. 8 shows another example of cell mapping performed by the cell mapper 140A shown in FIG. 4 for four-dimensional rotated constellation blocks.

FIG. 9 shows an example of cell interleaving performed by a cell interleaver 150A shown in FIG. 4 for two-dimensional rotated constellation blocks.

FIG. 10 shows an example of cell interleaving performed by the cell interleaver 150A shown in FIG. 4 for four-dimensional rotated constellation blocks.

FIG. 13 shows an example of slicing a FEC block for two-dimensional rotated constellation blocks.

FIG. 14 shows an example of slicing a FEC block for four-dimensional rotated constellation blocks.

FIG. 20 shows an example of processing performed by a Q-delay insertion unit 551 shown in FIG. 19 for two-dimensional rotated constellation blocks.

FIG. 21 shows an example of processing performed by the Q-delay insertion unit 551 shown in FIG. 19 for four-dimensional rotated constellation blocks.

FIG. 24C shows bit mapping for a 64-QAM constellation.

DESCRIPTION OF EMBODIMENTS

<<Examination and Discovery by the Inventor>>

First, description is provided on a transmission technology that employs generalized multi-dimensional rotated constellations (e.g., rotated quadrature amplitude modulation (QAM) constellations), with reference to the drawings.

Figure 1:
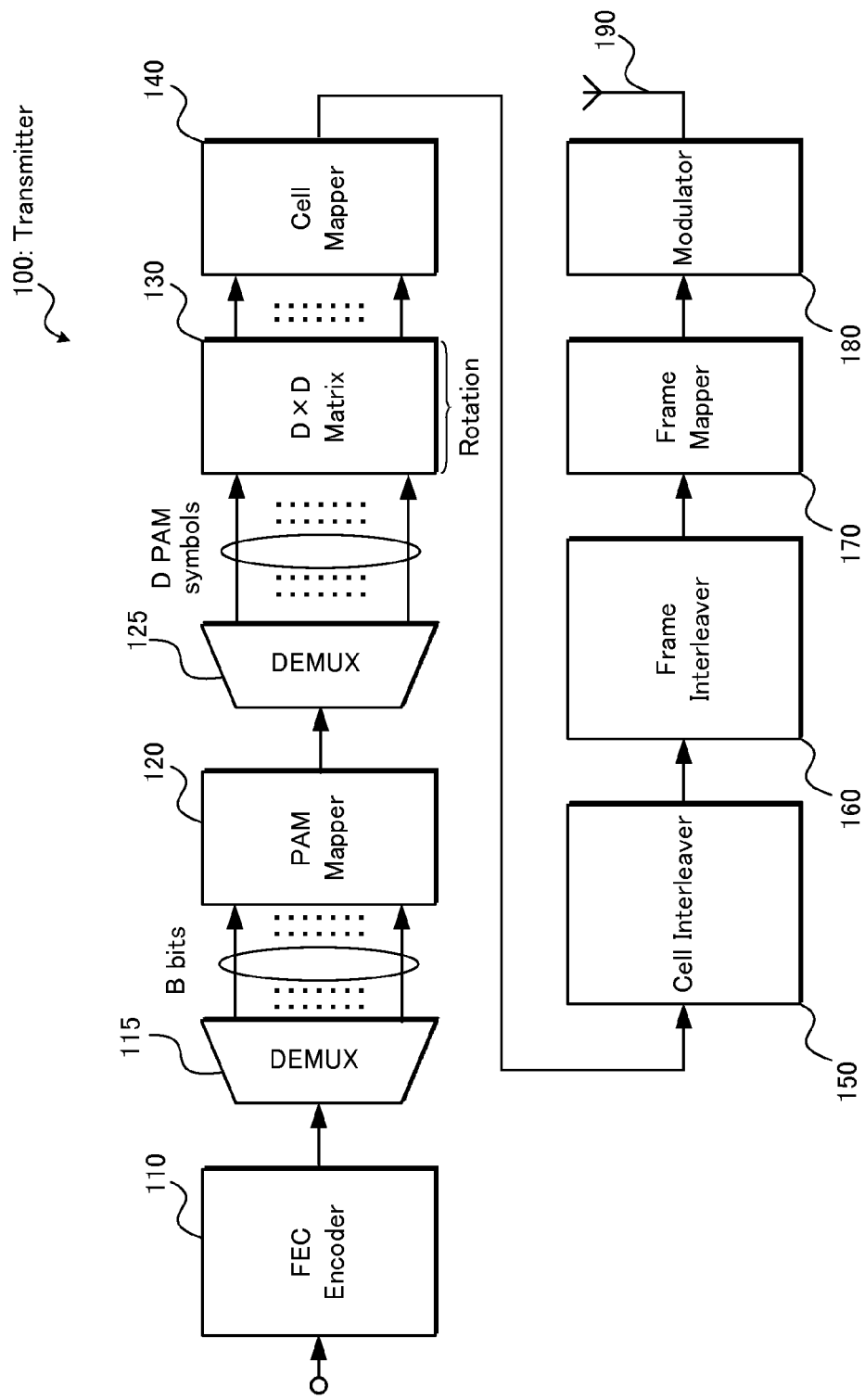
FIG. 1 is a block diagram showing the structure of a transmitter 100 that employs generalized rotated constellations.

FIG. 1 is a block diagram showing the structure of a transmitter that employs generalized multi-dimensional rotated constellations.

A transmitter 100 includes a forward-error-correction (FEC) encoder 110, a demultiplexer 115, a PAM mapper 120, a demultiplexer 125, a constellation rotation unit 130, a cell mapper 140, a cell interleaver 150, a frame interleaver 160, a frame mapper 170, a modulator 180, and a transmit antenna 190.

The transmitter 100 receives, as input, binary blocks of a predetermined length, which contain the information to be transmitted.

The FEC encoder 110 encodes each information block using a forward-error-correction (FEC) code. This yields a FEC codeword. The encoding processing includes calculation of redundancy bits and addition of the redundancy bits to the information block in order to make decoding of the information block by the receiver more robust against errors. Two notable examples of FEC code families are a low-density parity-check (LDPC) code and a turbo code. The present invention, however, does not particularly limit the type of FEC code used by the FEC encoder 110. The most important parameter in a FEC code is a code rate. The code rate is a ratio between the number of information bits and the number of codeword bits (code rate=number of information bits/number of codeword bits). Note that the present invention does not particularly limit the code rate.

The FEC codeword yielded by the encoding processing is provided to the demultiplexer 115. Hereinafter, a FEC codeword is referred to as a FEC block. The demultiplexer 115 demultiplexes the bits of the FEC block into groups of B bits, and provides the groups of B bits to the PAM mapper 120. The PAM mapper 120 maps the groups of B bits onto real-valued pulse amplitude modulation (PAM) symbols. Each PAM symbol takes a value from a discrete set of $2^B$ values. How the B bits are mapped onto PAM symbols is well understood and not directly relevant to the present invention. The relevant aspect is that each FEC block is transformed into a block of PAM symbols. In the following, the number of PAM symbols per FEC block will be denoted by $N_S$.

Prior to being mapped to PAM symbols, the FEC block may undergo additional processing steps, such as bit permutation or puncturing. These aspects are well known in the art.

The $N_S$ real-valued PAM symbols produced by the PAM mapper 120 are then provided to the demultiplexer 125. The demultiplexer 125 demultiplexes the $N_S$ real-valued PAM symbols into D-dimensional vectors that each have D real-valued PAM symbols as elements. These vectors can be regarded as identifying unique points in a D-dimensional space. The resulting $(2^B)^D$ combinations form a D-dimensional constellation.

Each D-dimensional vector is provided from the demultiplexer 125 to the constellation rotation unit 130. The constellation rotation unit 130 multiplies each D-dimensional vector by a D-by-D orthogonal matrix (hereinafter "D×D orthogonal matrix"). Here, letting the D-dimensional vector provided to the constellation rotation unit 130 be V, the orthogonal matrix used for matrix multiplication be R, and the D-dimensional rotated vector resulting from matrix multiplication be V', then V'=RV. The multiplication of the orthogonal matrix can be regarded as a generalized vector rotation in the D-dimensional space, hence the term "rotated constellations". As the present invention does not limit the orthogonal matrix (also referred to as "rotation matrix") used by the constellation rotation unit 130 to an orthogonal matrix with a particular structure, any orthogonal matrix may be used. Use of rotated constellations is a well-known technique in this technical field, and therefore a detailed explanation thereof is omitted. Precise details can be found in Patent Literature 1 (EP 2288048), which is incorporated herewith in its entirety.

Preferably, D is a power of 2, such as 2, 4, or 8. Typically $N_S$ is a multiple of D. If this is not the case, the last 1 to D−1 PAM symbols in the FEC block can be left unchanged, i.e. non-rotated. This affects none of the aspects of the present invention.

It is also preferred that $N_S$ is a multiple of 2.

In the following, the D-dimensional rotated vectors obtained by rotating vectors that each have D real-valued PAM symbols as elements are referred to as D-dimensional rotated constellation blocks or simply D-dimensional constellation blocks. The real symbols constituting a D-dimensional constellation block are referred to as components or dimensions.

Note that two-dimensional rotated constellation blocks are referred to as 2D rotated constellation blocks or as 2D-RC. Similarly, four-dimensional rotated constellation blocks are referred to as 4D rotated constellation blocks or as 4D-RC.

After the multiplication of the orthogonal matrix (after the rotation process), the $N_S$ real symbols (components) of each FEC block are provided from the constellation rotation unit 130 to the cell mapper 140. The cell mapper 140 maps the $N_S$ real symbols onto $N_C=N_S/2$ complex symbols (cell mapping). The complex symbols are also referred to as complex cells or simply cells.

The cell interleaver 150 receives the complex cells from the cell mapper 140, and interleaves the complex cells (cell interleaving).

In order to increase the time diversity of the system, the frame interleaver 160 performs interleaving so as to spread the $N_C$ complex cells of each FEC block along the time axis (frame interleaving). The frame mapper 170 maps the complex cells spread along the time axis onto a frame (frame mapping).

The frame interleaver 160 may be a block interleaver, a convolutional interleaver, or a combination of both. In the DVB-T2 standard for example, the frame interleaver 160 is a block interleaver and is referred to as a time interleaver.

The time diversity of the system increases with the interleaving duration, which should be maximized. Very long interleaving durations, however, lead to high latency, slow initial acquisition (e.g. for TV channel zapping), and high memory requirements in both the transmitter and the receiver.

Typically, the transmitted signal is organized in one or more frames of identical duration. The $N_C$ complex cells of each FEC block can be transmitted in one or more frames $N_F$. Preferably, the number of complex cells in each frame is the same. Within a frame, the complex cells can be transmitted in a single burst or interleaved with other complex cells over a longer duration. Spreading the complex cells over the entire frame provides the best diversity and robustness. In the present invention, however, the mechanism for frame interleaving and frame mapping is not limited to a particular mechanism.

After being subjected to frame interleaving and frame mapping, the complex cells are further processed by a processing block including at least the modulator 180, an up-converter (not shown), and a radio-frequency (RF) power amplifier (not shown). The modulator 180 uses, for example, orthogonal frequency-division multiplexing (OFDM) modulation. Also, the modulator 180 may include a function of frequency interleaving for increased frequency diversity. The up-converter converts a digital baseband signal into an analog radio-frequency (RF) signal. The RF power amplifier amplifies the power of the analog RF signal. The analog RF signal whose power has been amplified is then transmitted from the transmit antenna 190.

FIGS. 2A to 2E show examples of possible combinations of frame interleaving and frame mapping. In FIGS. 2A to 2E, as well as in later-described FIGS. 3A to 3D, the horizontal (lateral) axis and the vertical (longitudinal) axis represent time and frequency, respectively.

Figure 2A:
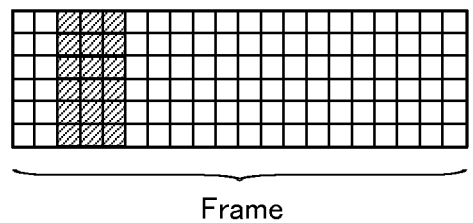
FIG. 2A shows an example of combining frame interleaving and frame mapping.

FIG. 2A shows the case when a FEC block is transmitted in a small portion of a frame. The resulting time diversity is low. If the region of the frame in which the FEC block is transmitted is affected by, for example, impulsive noise, all the complex cells of the FEC block will be affected by the impulsive noise and the FEC block may no longer be decodable.

Figure 2B:
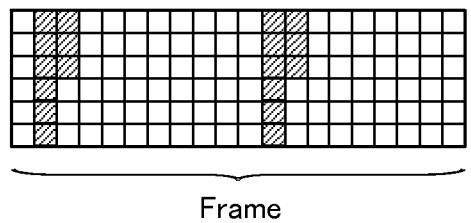
FIG. 2B shows another example of combining frame interleaving and frame mapping.

FIG. 2B shows the case when a FEC block is transmitted as two bursts over a frame. In the case of FIG. 2B, the time diversity increases as compared to the case shown in FIG. 2A. Hereinafter, the bursts are also referred to as slices.

Figure 2C:
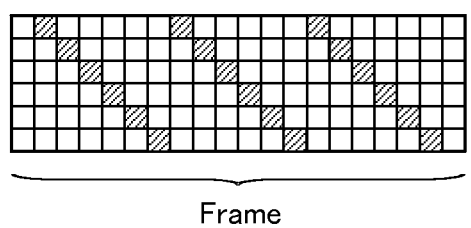
FIG. 2C shows another example of combining frame interleaving and frame mapping.

FIG. 2C shows the case when a FEC block is spread over an entire frame and transmitted. In the case of FIG. 2C, the time diversity increases significantly as compared to the cases shown in FIGS. 2A and 2B. If an impulsive noise destroys, for example, the beginning of the frame, only a part of the complex cells in the FEC block will be affected by the impulsive noise (the remaining part of the complex cells will not be affected). As a result, the probability of decoding failure is reduced.

Figure 2D:
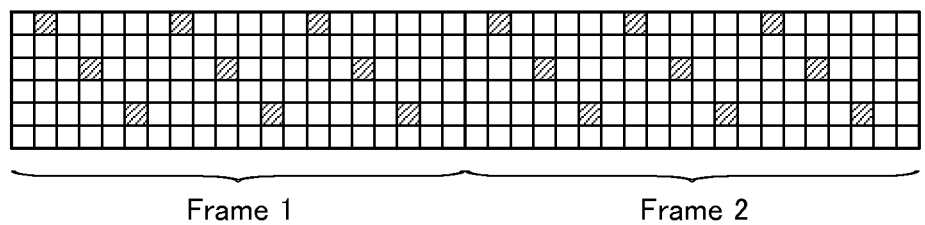
FIG. 2D shows another example of combining frame interleaving and frame mapping.

FIG. 2D shows the case when each FEC block is interleaved and spread over two adjacent frames and transmitted. In the case of FIG. 2D, the time diversity increases as compared to the cases shown in FIGS. 2A, 2B, and 2C. However, the required memory for interleaving and deinterleaving doubles in size.

Figure 2E:
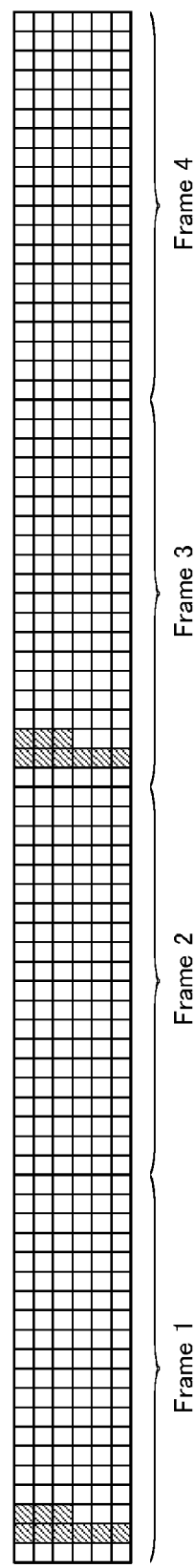
FIG. 2E shows another example of combining frame interleaving and frame mapping.

FIG. 2E shows the case when each FEC block is interleaved and spread over two non-adjacent frames with a gap of one frame in between and transmitted. In each of the two frames, the complex cells are transmitted as short bursts. This is known as time slicing and allows the receiver to save power consumption between bursts. The interleaving period is four frames, which further increases the amount of memory required for interleaving and deinterleaving, as compared to the case shown in FIG. 2C.

Generally, the time diversity may be maximized by (i) transmitting the complex cells of a FEC block in multiple frames and (ii) spreading the complex cells in each frame over as much of the frame duration as possible. These two aspects are referred to as inter-frame time diversity and intra-frame time diversity, respectively.

A conventional solution for maximizing time diversity is known from Non-Patent Literature 1 for rotated constellations in two dimensions. The conventional solution includes the following steps (1) to (3).

(1) Apply a 2D rotation between the real and imaginary components of each complex QAM symbol. Note that each of the real and imaginary components of each complex QAM symbol corresponds to one real-valued PAM symbol described above.

(2) After the application of 2D rotation, apply a relative cyclic delay of one complex cell between the real and the imaginary components of the $N_C$ complex cells in each FEC block.

(3) After the application of the cyclic delay, apply a pseudo-random permutation to the complex cells of each FEC block. The pseudo-random permutation is described as "cell interleaver" in the DVB-T2 standard.

Details on the above steps are disclosed in the Non-Patent Literature 1, and are well-known in this technical field. Accordingly, a detailed explanation about these steps is omitted here.

The aforementioned conventional solution reduces the average correlation of the fading experienced by the two components (dimensions) of each constellation block. However, due to a random number used for the pseudo-random permutation, two components of the same constellation block may end up being very close to or far from each other. Therefore, time diversity of the conventional solution is not optimal.

In a communication system that employs rotated constellations, it is important that the D components of a D-dimensional constellation block experience uncorrelated channel fading. Therefore, the D components in the D-dimensional constellation block are preferably mapped to D different complex cells and the channel fading experienced by these complex cells should be as uncorrelated as possible. In this way, the gain of the rotated constellations, and thus the performance of the system, is maximized.

In the general case of rotated constellations in D dimensions, the inventor has realized that the best system performance is obtained if the time intervals (distances) between two components of the same constellation block are as evenly distributed as possible and as large as possible, for all constellation blocks of a FEC block.

When a FEC block is spread over $N_F$ (>1) frames, the D components (dimensions) of each constellation block must be distributed as evenly as possible among the $N_F$ frames. If D is larger than $N_F$, some frames will carry two or more components from some constellation blocks. In that case, these components must be spread over the frame as evenly as possible.

The present invention ensures that all these conditions can be easily fulfilled.

FIGS. 3A to 3D show examples of spreading the components of a 2D-RC and a 4D-RC.

FIGS. 3A, 3B, 3C, and 3D each show an example of mapping two components of a 2D-RC and of mapping four components of a 4D-RC when a FEC block is mapped to one frame, two frames, three frames, and four frames respectively.

In each of FIGS. 3A to 3D, each of the smallest squares corresponds to one component. The groups of shaded squares in each figure represent two components of the same 2D-RC and four components of the same 4D-RC.

When each 2D-RC is spread over four frames, mapping the two components of a 2D-RC one each onto frame 1 and frame 3, or onto frame 2 and frame 4, guarantees that the time interval between two components of every 2D-RC is two frames. Therefore, it can easily be seen that the mapping shown by the example in FIG. 3D is optimal.

Mapping the two components of a 2D-RC one each onto frame 1 and frame 2, or onto frame 3 and frame 4, makes the time interval between the two components of every 2D-RC the same, but the time interval is only one frame. Furthermore, mapping the two components of a 2D-RC one each onto frame 1 and frame 4, or onto frame 2 and frame 3, makes the average time interval between the two components of every 2D-RC two frames, but the time interval between the two components of a 2D-RC is not the same for every 2D-RC (i.e. the time interval is either one frame or three frames). Accordingly, as compared to the mapping shown by the example in FIG. 3D, these are not good mappings.

Embodiment 1

A transmitter, a transmission method, a receiver, and a reception method according to Embodiment 1 of the present invention are based on the <<Examination and Discovery by the Inventor>> above, and are described below with reference to the drawings.

<Transmitter and Transmission Method>

Figure 4:
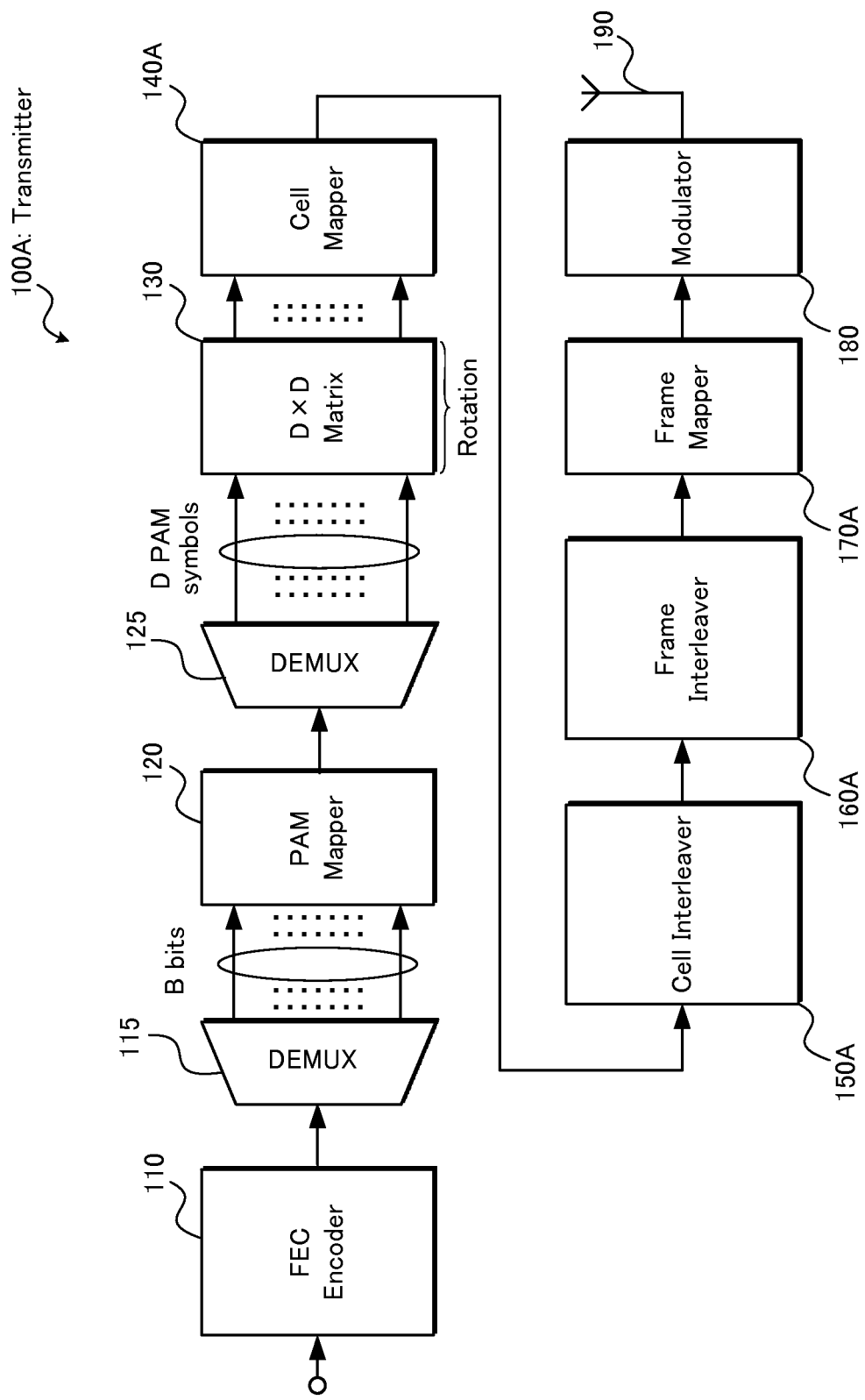
FIG. 4 is a block diagram showing the structure of a transmitter 100A that employs rotated constellations according to Embodiment 1 of the present invention.

FIG. 4 is a block diagram showing the structure of a transmitter 100A in Embodiment 1 of the present invention. In Embodiment 1, the same reference signs are used and a description is omitted for constituent elements to which applies the description of the constituent elements of the transmitter 100 in FIG. 1 as described in the section <<Examination and Discovery by the Inventor>> above.

The transmitter 100A in FIG. 4 includes a FEC encoder 110, a demultiplexer 115, a PAM mapper 120, a demultiplexer 125, a constellation rotation unit 130, a cell mapper 140A, a cell interleaver 150A, a frame interleaver 160A, a frame mapper 170A, a modulator 180, and a transmit antenna 190.

To facilitate understanding of the description in Embodiment 1, the following description is provided with an example where a FEC block contains 24 complex cells, and the rotated constellation blocks are either 2D-RC or 4D-RC.

The cell mapper 140A maps D components of each D-dimensional constellation block provided from the constellation rotation unit 130 onto D adjacent (contiguous) complex cells in a complex cell sequence including $N_C$ complex cells. Note that the present invention does not particularly limit the details of the mapping processing as long as the D components in each D-dimensional constellation block are mapped in D contiguous complex cells.

The following describes two different procedures employed by the cell mapper 140A to map the D components of each D-dimensional constellation block onto D contiguous complex cells.

In one cell mapping procedure, the cell mapper 140A maps the D components of each D-dimensional constellation block onto a real component and an imaginary component of each of D/2 contiguous complex cells, and inserts a relative delay of D/2 complex cells between the real component and the imaginary component of each of the complex cells. The relative delay is cyclical with a specified period. The specified period is generally a multiple of D and a divisor of $N_C$. The specified period is referred to as a cyclic delay period.

FIGS. 5 and 6 show specific examples of this processing. Note that in each of FIGS. 5 and 6, and FIGS. 7, 8, 11, 12, 13, 14, 20, and 21 which are described later, each of the smallest squares corresponds to one component of a 2D-RC or 4D-RC, and each pair of the smallest squares, which are adjacent vertically (the top square being a real component Re and the bottom square being an imaginary component Im), corresponds to one complex cell. In FIGS. 5 and 6, and FIGS. 7, 8, 11, 12, 13, 14, 20, and 21 which are described later, the values in the smallest squares (1, 2, . . . ) are indexes that each indicate a 2D-RC or a 4D-RC.

FIG. 5 shows an example of cell mapping performed by the cell mapper 140A shown in FIG. 4 for two-dimensional rotated constellation blocks (2D-RC).

As shown in the portion (a) of FIG. 5, D=2 components of each 2D-RC are mapped onto the real component and the imaginary component of a D/2=1 complex cell by the cell mapper 140A. Then, as shown in the portions (b), (c), (d), and (e) of FIG. 5, the cell mapper 140A cyclically delays the imaginary component of each complex cell by a D/2=1 complex cell within the cyclic delay period (simply denoted as "period" in FIG. 5). The portions (b), (c), (d), and (e) of FIG. 5 show the cases where the cyclic delay periods are 24, 8, 4, and 2, respectively.

FIG. 6 shows an example of cell mapping performed by the cell mapper 140A shown in FIG. 4 for four-dimensional rotated constellation blocks (4D-RC).

As shown in the portion (a) of FIG. 6, D=4 components of each 4D-RC are mapped onto the real components and the imaginary components of D/2=2 adjacent complex cells by the cell mapper 140A. Then, as shown in the portions (b), (c), and (d) of FIG. 6, the cell mapper 140A cyclically delays the imaginary component of each complex cell by D/2=2 complex cells within the cyclic delay period (simply denoted as "period" in FIG. 6). The portions (b), (c), and (d) of FIG. 6 show the cases where the cyclic delay periods are 24, 8, and 4, respectively. For obvious reasons, a cyclic delay period of 2 is not possible in the case of 4D-RC. Although not shown in FIGS. 5 and 6, the cyclic delay period for 2D-RC may be 12 or 6, and the cyclic delay period for 4D-RC may be 12.

Note that in order to insert a relative cyclic delay of D/2 between the real components and the imaginary components, the cell mapper 140A may cyclically delay the real components by D/2 complex cells instead of cyclically delaying the imaginary components by D/2 complex cells as shown in FIGS. 5 and 6.

Alternatively, in another cell mapping procedure, the cell mapper 140A maps each pair of D-dimensional constellation blocks onto D contiguous complex cells. This cell mapping is equivalent to the case where the cyclic delay period is D in the aforementioned cell mapping procedure. Specifically, the cell mapper 140A maps D components of one of the pair of constellation blocks onto the real components of D complex cells, and maps D components of the other constellation block onto the imaginary components of D complex cells.

FIGS. 7 and 8 show specific examples of this processing.

FIG. 7 shows an example of cell mapping performed by the cell mapper 140A shown in FIG. 4 for two-dimensional rotated constellation blocks (2D-RC).

As shown in FIG. 7, the cell mapper 140A maps, for each pair of 2D-RC, two components of one of the pair of 2D-RC onto the real components of two contiguous complex cells, and maps two components of the other one of the pair of 2D-RC onto the imaginary components of the same two contiguous complex cells. For example, concerning a 2D-RC indicated by index 1 and a 2D-RC indicated by index 2, the cell mapper 140A maps two components of the 2D-RC of index 1 onto the real components of two contiguous complex cells, and maps two components of the 2D-RC of index 2 onto the imaginary components of the same two contiguous complex cells.

FIG. 8 shows an example of cell mapping performed by the cell mapper 140A shown in FIG. 4 for four-dimensional rotated constellation blocks (4D-RC).

As shown in FIG. 8, the cell mapper 140A maps, for each pair of 4D-RC, four components of one of the pair of 4D-RC onto the real components of four contiguous complex cells, and maps four components of the other one of the pair of 4D-RC onto the imaginary components of the same four contiguous complex cells. For example, concerning a 4D-RC indicated by index 1 and a 4D-RC indicated by index 2, the cell mapper 140A maps four components of the 4D-RC of index 1 onto the real components of four contiguous complex cells, and maps four components of the 4D-RC of index 2 onto the imaginary components of the same four contiguous complex cells.

The complex cells of a FEC block resulting from the cell mapping by the cell mapper 140A are provided to the cell interleaver 150A. The cell interleaver 150A applies a permutation (cell interleaving) to the complex cells of the FEC block so that D components of each D-dimensional constellation block are evenly spread over the entire FEC block. Here, the parameters relating to this permutation are: $N_C$ which indicates the number of complex cells per FEC block; and D which indicates the number of dimensions (the number of components) of each constellation block. The permutation by the cell interleaver 150A corresponds to the pseudo-random cell permutation in the DVB-T2 standard, although the details of the processing are different from the pseudo-random cell permutation. The permutation by the cell interleaver 150A ensures an approximately even spreading of the D components of each D-dimensional constellation block. This improves the performance of the rotated constellation.

The following describes a preferred permutation performed by the cell interleaver 150A on the complex cells in a FEC block.

This preferred permutation is equivalent to the following processing.

The cell interleaver 150A writes $N_C$ complex cells of the FEC block column by column into an interleaver matrix with D rows and ceil($N_C$/D) columns, in the order in which the $N_C$ complex cells are provided from upstream. Then, the cell interleaver 150A reads the complex cells that have been written from the interleaver matrix, row by row, and outputs the complex cells to downstream in the order in which the complex cells are read. Note that the function ceil(A) is a function that returns the smallest integer greater than or equal to A.

Suppose that $N_C$ is not a divisor of D. In this case, when the $N_C$ complex cells in the FEC block are written in the interleaver matrix, no complex cells will be written in a part of the last column of the interleaver matrix. However, since $N_C$ is always a multiple of D/2, only D/2 complex cells will be missing in the last column (i.e. half the column).

FIGS. 9 and 10 show specific examples of this processing. Note that the values (1, 2, . . . ) in FIGS. 9 and 10 are not indexes indicating the components of constellation blocks, but are indexes indicating the complex cells of a FEC block. The arrows in each of FIGS. 9 and 10 indicate a write order and a read order.

FIG. 9 shows an example of cell interleaving performed by the cell interleaver 150A shown in FIG. 4 for two-dimensional rotated constellation blocks (2D-RC).

As shown in the portion (a) of FIG. 9, the cell interleaver 150A writes 24 complex cells in the FEC block column by column into an interleaver matrix with 2 (=D) rows and 12 (=ceil(24/2)) columns, in the order in which the complex cells are input from upstream, i.e., "1, 2, 3, 4, . . . , 21, 22, 23, and 24". Then, as shown in the portion (b) of FIG. 9, the cell interleaver 150A reads the 24 complex cells of the FEC block that have been written, row by row, from the interleaver matrix, and outputs the complex cells to downstream in the order in which the complex cells are read, i.e., "1, 3, . . . , 21, 23, 2, 4, . . . , 22, and 24".

FIG. 10 shows an example of cell interleaving performed by the cell interleaver 150A shown in FIG. 4 for four-dimensional rotated constellation blocks (4D-RC).

As shown in the portion (a) of FIG. 10, the cell interleaver 150A writes 24 complex cells in the FEC block column by column into an interleaver matrix with 4 (=D) rows and 6 (=ceil(24/4)) columns, in the order in which the complex cells are input from upstream, i.e., "1, 2, 3, 4, . . . , 21, 22, 23, and 24". Then, as shown in the portion (b) of FIG. 10, the cell interleaver 150A reads the 24 complex cells of the FEC block that have been written, row by row, from the interleaver matrix, and outputs the complex cells to downstream in the order in which the complex cells are read, i.e., "1, 5, . . . , 21, 2, 6, 20, and 24".

The aforementioned permutation by the cell interleaver 150A shown in FIG. 4 may also be expressed in mathematical terms.

Suppose that $N_C$ is a multiple of D. In this case, with index i denoting the index of a complex cell input to the cell interleaver 150A and index j denoting the index of a complex cell output from the cell interleaver 150A, the index j can be expressed as a function of index i.

$$j = rem(i,D) \times N_C/D + floor(i/D)$$

Here, i and j are each 0, 1, . . . , $N_C-1$.

Note that the function rem(i, D) is a function that returns the remainder obtained by dividing i by D. The function floor(A) is a function that returns the largest integer less than or equal to A.

After the cell interleaver 150A applies the permutation, the resulting FEC block consists of D contiguous regions, each region containing one component from each constellation block. The distance (interval) between the components of each constellation block is $N_C/D$ complex cells or $N_C/D-1$ complex cells with no exception, or except for a predetermined number (a value obtained by dividing $N_C$ by the cyclic delay period) of constellation blocks. In other words, the spreading is as even as possible.

This means that the cell mapper 140A and the cell interleaver 150A generate $N_C$ complex cells from the $N_S$ components in the FEC block in such a manner that, in a complex cell sequence including the $N_C$ complex cells, the distance between D components of each constellation block is $N_C/D$ complex cells or $N_C/D-1$ complex cells with no exception, or except for the predetermined number (the value obtained by dividing $N_C$ by the cyclic delay period) of constellation blocks.

Figure 11:
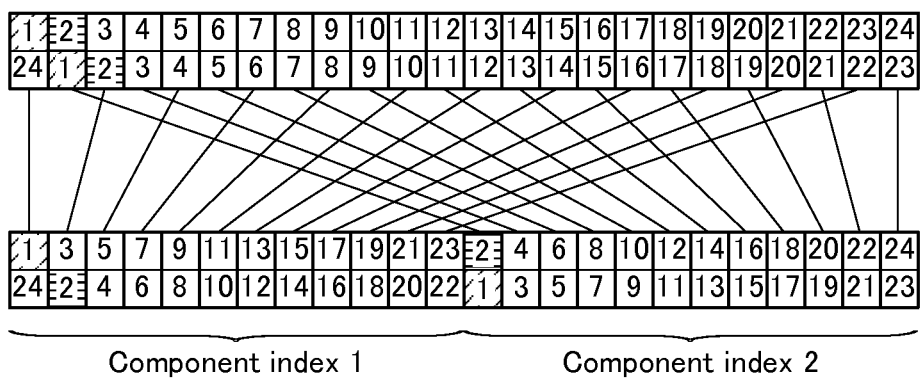
FIG. 11 shows an example of a result of cell mapping and cell interleaving for two-dimensional rotated constellation blocks.
Figure 12:
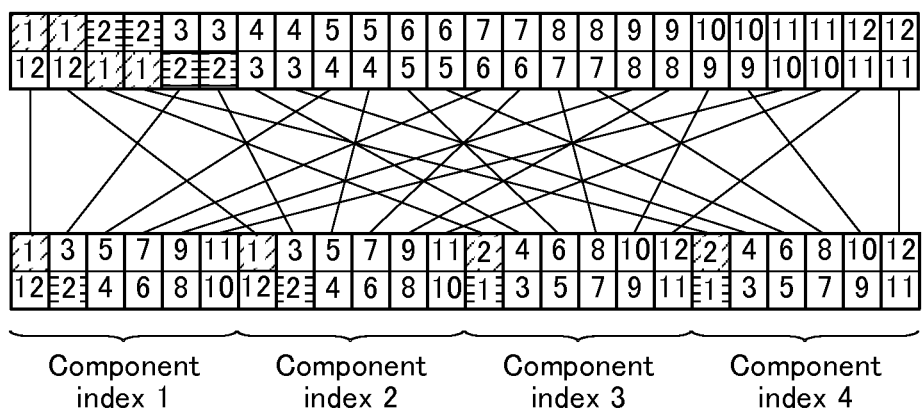
FIG. 12 shows an example of a result of cell mapping and cell interleaving for four-dimensional rotated constellation blocks.

FIGS. 11 and 12 show examples of the results of cell mapping and cell interleaving described above.

FIG. 11 shows an example of the results of cell mapping and cell interleaving for two-dimensional rotated constellation blocks (2D-RC), and FIG. 12 shows an example of the results of cell mapping and cell interleaving for four-dimensional rotated constellation blocks (4D-RC). In each of the examples, the cyclic delay period consists of the maximum number of complex cells, i.e., 24 complex cells.

As shown in FIG. 11, two components of each 2D-RC are respectively included in two regions of component indexes 1 and 2, and, as shown in FIG. 12, four components of each 4D-RC are respectively included in four regions of component indexes 1 to 4.

It can be seen from FIGS. 11 and 12 that the D components are approximately evenly spread over the entire FEC block. As shown in FIG. 11, in 2D-RC, the minimum distance between the complex cells each having a component of the same constellation block is 12 (=$N_C/D$) complex cells in the case of odd-numbered constellation blocks; 11 (=$N_C/D-1$) complex cells in the case of even-numbered constellation blocks, except for the $24^{th}$ constellation block; and 23 complex cells in the case of the $24^{th}$ constellation block. As shown in FIG. 12, in 4D-RC, the minimum distance between the complex cells each having a component of the same constellation block is 6 (=$N_C/D$) complex cells in the case of odd-numbered constellation blocks; 5 (=$N_C/D-1$) complex cells in the case of even-numbered constellation blocks, except for the $12^{th}$ constellation block; and 6 (=$N_C/D$) complex cells in the case of the $12^{th}$ constellation block.

The permuted FEC block is mapped onto one or more frames in sequential order. If the FEC block is spread over $N_F>1$ frames, the FEC block is first divided into $N_F$ contiguous slices, and each slice is mapped onto exactly one of the $N_F$ frames. The FEC block is divided into $N_F$ slices in such a manner that the difference in size between the $N_F$ slices is one complex cell at a maximum. Preferably, the $N_F$ slices are of equal size in order to ensure optimum time diversity. This processing is performed by the frame interleaver 160A and the frame mapper 170A.

Figure 14:
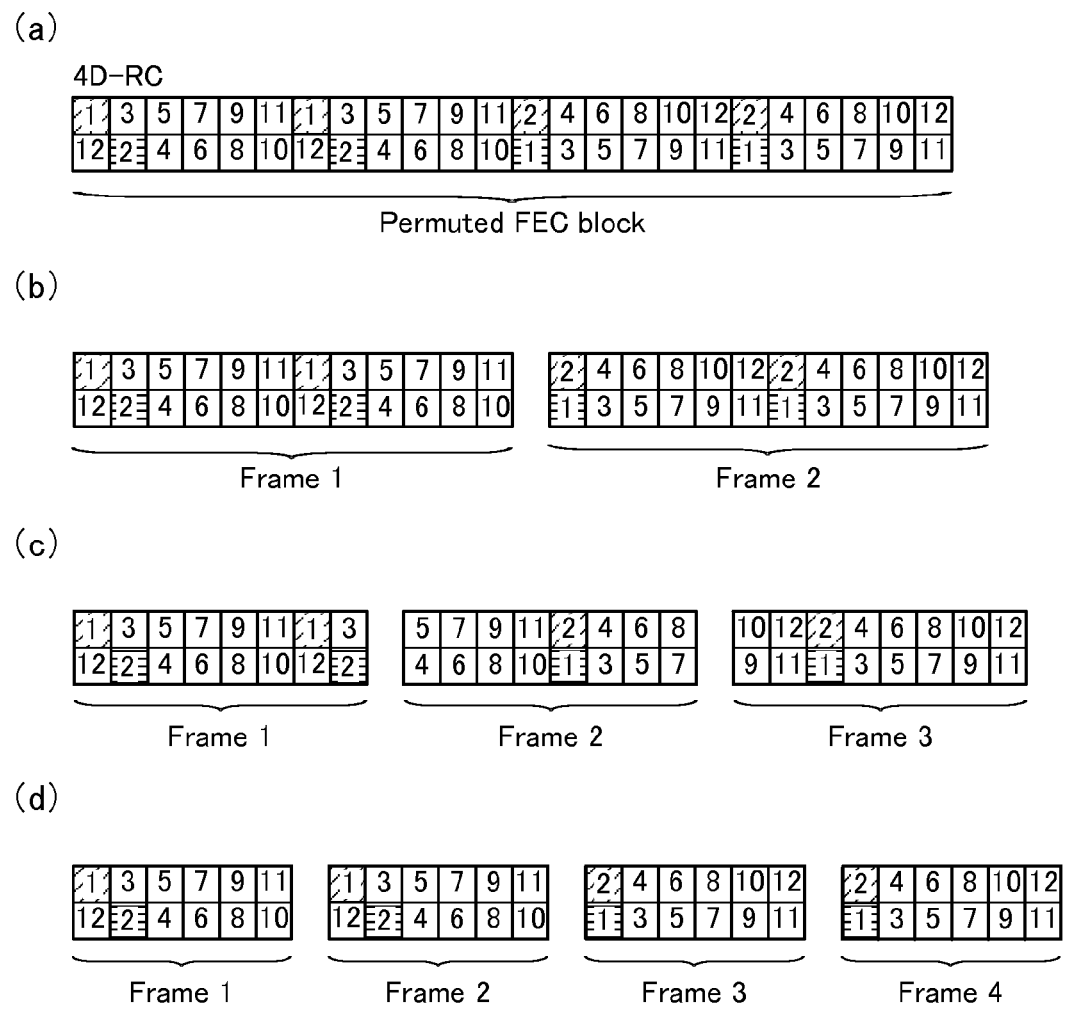

FIGS. 13 and 14 show examples of the slicing of the FEC block.

FIG. 13 shows examples of the slicing of the FEC block for two-dimensional rotated constellation blocks (2D-RC). The portion (a) of FIG. 13 shows the FEC block permuted by the cell interleaver 150A. The portions (b), (c), and (d) of FIG. 13 show the slicing of the FEC block over two, three, and four frames, respectively.

FIG. 14 shows examples of the slicing of the FEC block for four-dimensional rotated constellation blocks (4D-RC). The portion (a) of FIG. 14 shows the FEC block permuted by the cell interleaver 150A. The portions (b), (c), and (d) of FIG. 14 show the slicing of the FEC block over two, three, and four frames, respectively.

The spreading of the D components of each constellation block (two components of each 2D-RC and four components of each 4D-RC) is as good as it can be.

When slicing is used (cf. FIG. 2B), i.e. the data is transmitted in several bursts (or slices) in each frame instead of being distributed over the frame, each frame will be divided into slices of almost equal size. Preferably, the difference in the number of complex cells included in each slice is one at a maximum. The resulting distribution of the D components of each constellation block is still optimal.

The following describes a preferred embodiment for spreading each FEC block over $N_F$ frames.

Figure 15:
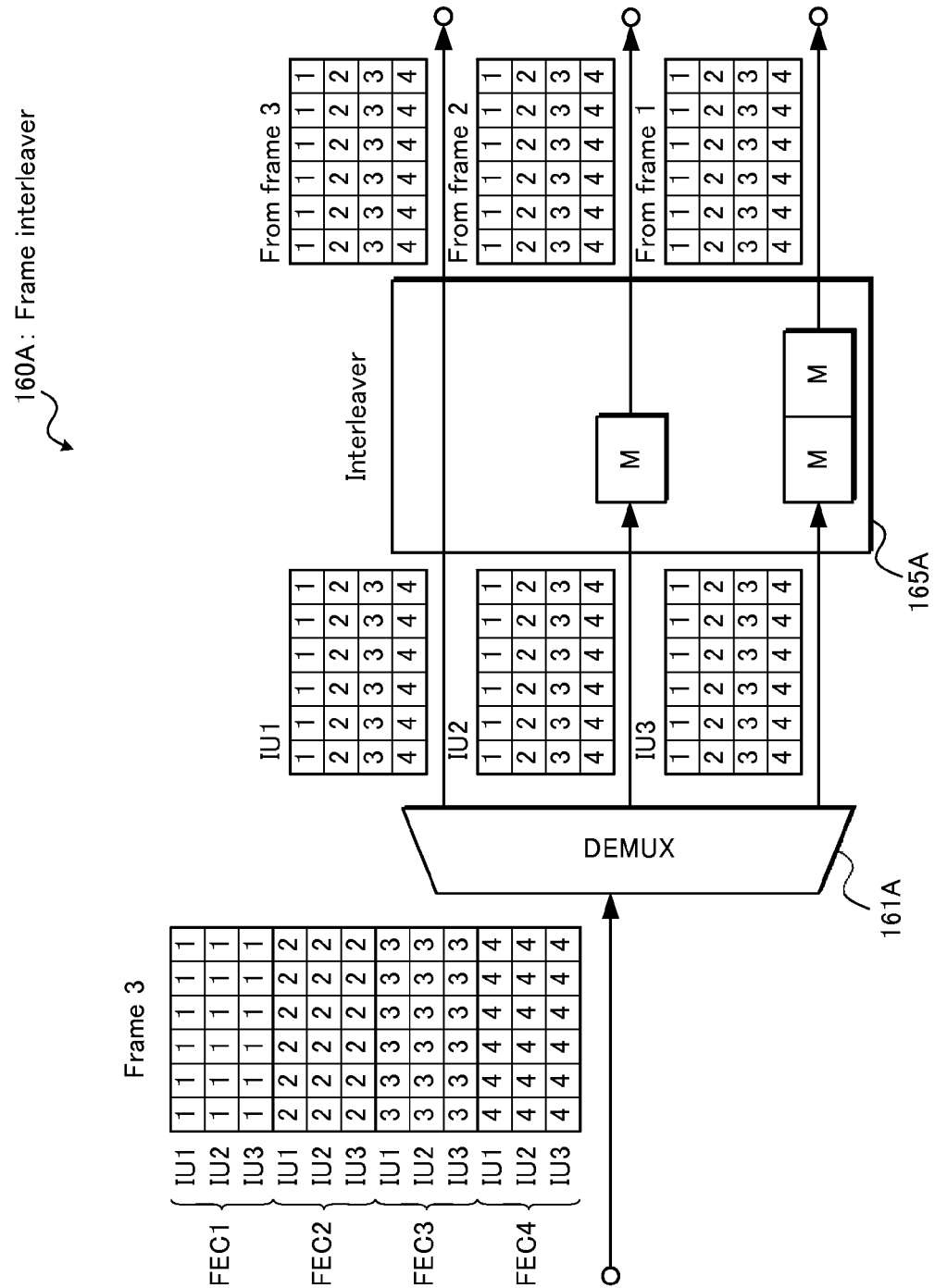
FIG. 15 is a block diagram showing the structure of a frame interleaver 160A shown in FIG. 4.

FIG. 15 is a block diagram showing the structure of the frame interleaver 160A of FIG. 4. The frame interleaver 160A in FIG. 15 is a convolutional interleaver, and frame interleaving is performed over $N_F=3$ frames. Each frame consists of four FEC blocks. Note that "1" to "4" in FIG. 15 are values that identify FEC blocks.

The frame interleaver 160A includes a demultiplexer 161A and an interleaver 165A. In the example of FIG. 15, frames 1, 2, 3 are sequentially input to the frame interleaver 160A in the stated order.

The demultiplexer 161A divides each FEC block into $N_F$ blocks, and feeds the $N_F$ blocks one by one to $N_F$ interleaver branches of the interleaver 165A. The demultiplexer 161A divides each FEC block into $N_F$ blocks where the difference in the number of complex cells included in each of the $N_F$ blocks is one at a maximum. Ideally, the demultiplexer 161A divides each FEC block into $N_F$ blocks of equal size. Note that the $N_F$ blocks are referred to as interleaving units (IUs).

The interleaver 165A applies a delay, which depends on a branch index, to an input from the demultiplexer 161A. Typically, the branch delay is equal to a delay in the number of frames corresponding to a zero-based branch index, i.e., 0 frames, 1 frame, or 2 frames in the example of FIG. 15. Note that in the example of FIG. 15, the interleaver 165A is such that, in order to perform the branch delay, the branch of branch index 0 does not include any memory block, the branch of branch index 1 includes one memory block M, and the branch of branch index 2 includes two memory blocks M. Each memory block M accommodates the complex cells of the same number of interleaving units as the number of FEC blocks within a frame, i.e., the complex cells of four interleaving units in this example.

The frame mapper 170A maps the output of the interleaver 165A in the frame interleaver 160A onto frames.

Figure 16:
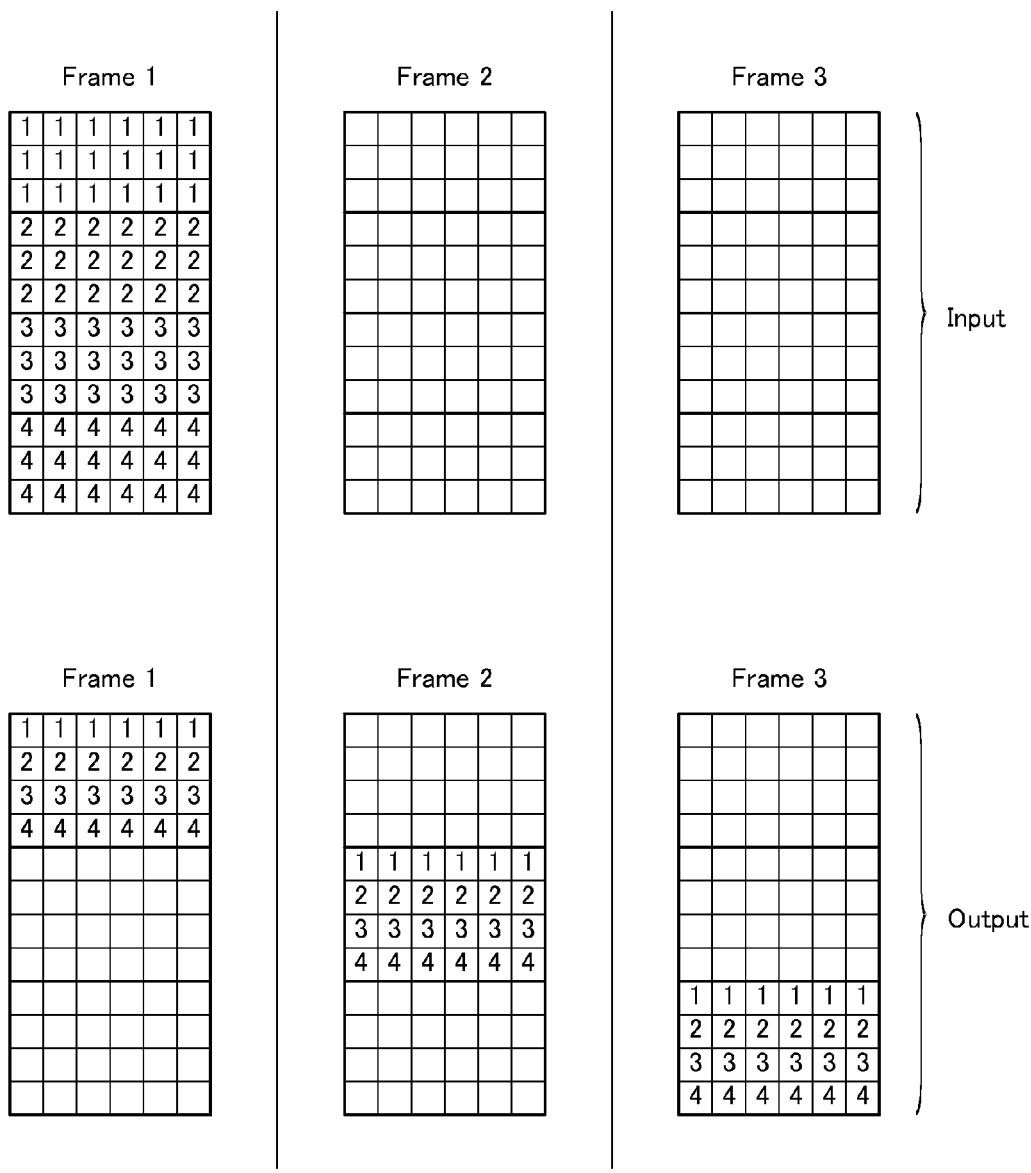
FIG. 16 schematically shows an example of spreading a FEC block over a plurality of frames, which is performed by a frame interleaver 160A shown in FIG. 15.

As a result, each FEC block is spread over three adjacent frames. FIG. 16 shows an example where four FEC blocks in frame 1 are spread over three frames.

The interleaved data for each frame may be further divided into several slices. The effect is that each interleaving unit is divided into many slices. Accordingly, each FEC block is divided first into interleaving units and then into slices.

Figure 17:
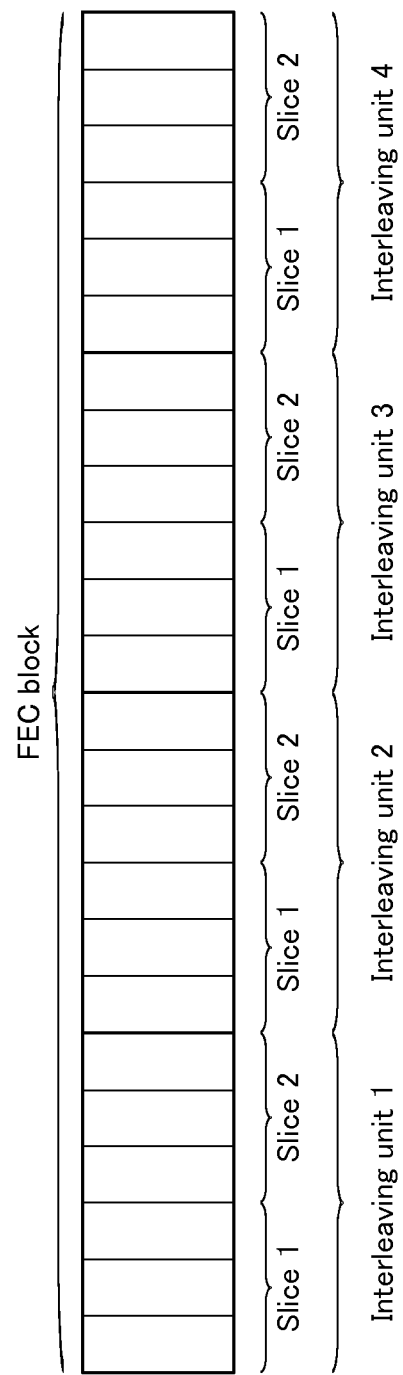
FIG. 17 shows an example of splitting a FEC block into interleaving units and further splitting the interleaving units into slices.

FIG. 17 shows an example for 24 complex cells per FEC block, interleaving over four frames, and two slices per frame. In the example of FIG. 17, all slices have the same size, i.e., 24/(4×2)=3 cells. If this number is not an integer, each FEC block is divided such that the difference in the number of complex cells included in each slice is one at a maximum.

<Receiver and Reception Method>

Figure 18:
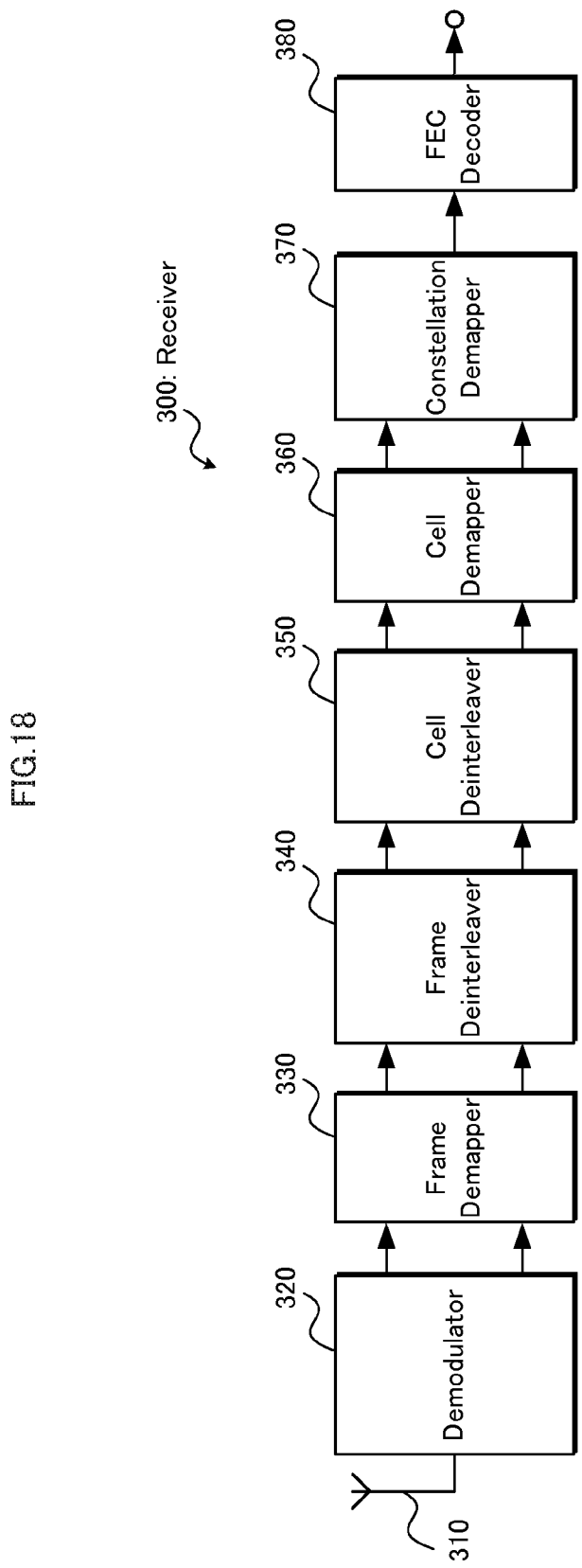
FIG. 18 is a block diagram showing the structure of a receiver 300 that employs rotated constellations according to Embodiment 1 of the present invention.

FIG. 18 is a block diagram showing the structure of a receiver 300 according to Embodiment 1 of the present invention. The receiver 300 in FIG. 18 corresponds to the transmitter 100A in FIG. 4, and mirrors the functionality of the transmitter 100A.

The receiver 300 includes a receive antenna 310, a demodulator 320, a frame demapper 330, a frame deinterleaver 340, a cell deinterleaver 350, a cell demapper 360, a constellation demapper 370, and a forward error correction (FEC) decoder 380.

The demodulator 320 receives a baseband signal from a radio-frequency (RF) frontend. The RF frontend typically includes the receive antenna 310, a tuner (not shown) for tuning into a desired channel, and a down-converter (not shown) for converting an analog RF signal into a digital baseband signal.

The demodulator 320 demodulates the digital baseband signal received from the RF frontend. In other words, the demodulator 320 calculates channel fading coefficients based on the digital baseband signal and calculates complex symbols (complex cells) based on the calculated channel fading coefficients. Then, the demodulator 320 outputs a stream of complex cells to the frame demapper 330.

The frame demapper 330 has a function corresponding to the frame mapping performed by the frame mapper 170A in the transmitter 100A, and extracts, from the frame (cell stream), complex cells belonging to a desired service or program according to a schedule notified by the transmitter. The frame deinterleaver 340 deinterleaves (frame deinterleaving) the extracted complex cells so as to return the complex cells to the order before interleaving by the frame interleaver 160A of the transmitter 100A. The output of the frame deinterleaver 340 consists of a plurality of FEC blocks per frame.

The cell deinterleaver 350 deinterleaves (cell deinterleaving) $N_C$ complex cells of each FEC block so as to return the $N_C$ complex cells to the order before interleaving by the cell interleaver 150A of the transmitter 100A.

The cell demapper 360 extracts D real symbols in each D-dimensional constellation block mapped onto the complex cells of a FEC block. This extraction is performed based on the mapping positions of the D real symbols mapped onto complex cells by the cell mapper 140A of the transmitter 100A.

The constellation demapper 370 demodulates the D-dimensional constellation blocks. For example, the constellation demapper 370 jointly demodulates the D real symbols of each D-dimensional constellation block, and produces D×B "soft" bits for each D-dimensional constellation block. Note that in one processing step, the constellation demapper 370 performs derotation corresponding to the rotation by the constellation rotation unit 130 of the transmitter 100A and demapping corresponding to the mapping by the PAM mapper 120 of the transmitter 100A.

The FEC decoder 380 decodes the soft bits of each FEC block in accordance with the FEC code used by the FEC encoder 110 of the transmitter 100A and provides the results of decoding to subsequent processing blocks for further processing.

<<Further Examination and Further Discovery by the Inventor>>

The DVB-T2 (Digital Video Broadcasting-Second Generation Terrestrial) standard is an improvement of the television standard DVB-T standard, and discloses a second generation transmission system for digital terrestrial television broadcasting. It specifies the channel coding/modulation system intended for digital television services and generic data.

Figure 19:
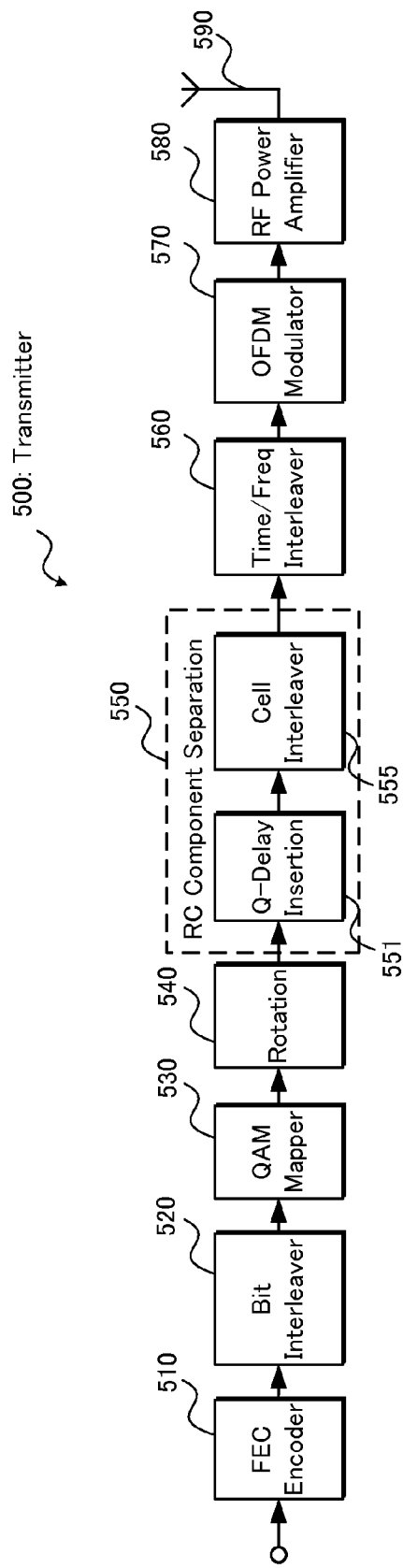
FIG. 19 is a block diagram showing the structure of a transmitter 500 that employs rotated quadrature amplitude modulation (QAM) constellations according to the DVB-T2 standard.

FIG. 19 is a block diagram showing the structure of a transmitter 500 that employs rotated quadrature amplitude modulation (QAM) constellations according to the DVB-T2 standard.

The transmitter 500 includes a FEC encoder 510, a bit interleaver 520, a QAM mapper 530, a constellation rotation unit 540, an RC component separation unit 550 (including a Q-delay insertion unit 551 and a cell interleaver 555), a time/frequency interleaver 560, an OFDM modulator 570, an RF power amplifier 580, and a transmit antenna 590.

The transmitter 500 receives, as input, binary blocks of a predetermined length, which contain the information to be transmitted.

The FEC encoder 510 encodes each information block using a FEC code. According to the DVB-T2 standard, a low-density parity-check (LDPC) code is used as the FEC code.

The bit interleaver 520 interleaves the bits of a FEC codeword (FEC block) yielded by the encoding processing (bit interleaving), and provides the bit-interleaved FEC block to the QAM mapper 530. This improves the robustness of the system.

The QAM mapper 530 maps the bit-interleaved FEC block onto complex QAM symbols a predetermined number of bits at a time. Typically, a set of B bits modulates the real component of a complex QAM symbol and another set of B bits modulates the imaginary component of the complex QAM symbol. Each of the real and imaginary components of the complex QAM symbols is therefore independent and can be regarded as a real-valued pulse amplitude modulation (PAM) symbol (the same PAM symbol as the PAM symbol produced by the PAM mapper 120 shown in FIGS. 1 and 4). As a result of the mapping processing, each FEC block is transformed into a block of complex QAM symbols.

The constellation rotation unit 540 rotates the complex QAM symbols produced by the QAM mapper 530 in order to introduce a dependence between the two real-valued PAM symbols that constitute each of the complex QAM symbols. This increases the robustness in fading channels. This rotation processing is also referred to as the processing of jointly encoding the two real-valued PAM symbols. The rotated complex QAM symbols are regarded as indicators indicating unique points in a two-dimensional space. The resulting $(2^B)^2$ combinations form a two-dimensional constellation. The rotation by the constellation rotation unit 540 is performed by multiplying a vector, which has two real-valued PAM symbols as vector elements, by a 2×2 orthogonal matrix.

The explanation on the constellation rotation unit 130 shown in FIG. 1 is applicable when joint encoding of two real-valued PAM symbols is generalized as joint encoding of D real-valued PAM symbols. Briefly, the constellation rotation unit 540 performs joint encoding by multiplying a D-dimensional vector, which has D real-valued PAM symbols as elements, by a D×D orthogonal matrix.

After the multiplication of the orthogonal matrix (after the rotation process), $N_S$ real symbols (components) of each FEC block are provided from the constellation rotation unit 540 to the RC component separation unit 550. The RC component separation unit 550 maps the $N_S$ real symbols of each FEC block onto $N_C = N_S/2$ complex symbols (complex cells), so that the D real symbols of each D-dimensional constellation block are mapped onto D different complex symbols (complex cells). In order to achieve good performance with rotated constellations, it is necessary that the D real symbols of each D-dimensional rotated constellation block be spread as much as possible in time and frequency. In this way, the channel fading that the D real symbols experience becomes as uncorrelated as possible.

According to the DVB-T2 standard, the Q-delay insertion unit 551 of the RC component separation unit 550 first maps the D real symbols of each D-dimensional constellation block onto D/2 complex cells, and thereby maps the $N_S$ real symbols of a FEC block onto $N_C$ complex cells. Next, the Q-delay insertion unit 551 cyclically delays the imaginary (or quadrature, hence the name Q-delay) components by D/2 complex cells, and outputs the resulting complex cells to the cell interleaver 555.

FIGS. 20 and 21 show specific examples of this processing. In FIGS. 20 and 21, it is assumed that each FEC block includes 24 complex cells.

FIG. 20 shows examples of the processing performed by the Q-delay insertion unit 551 shown in FIG. 19 for two-dimensional rotated constellation blocks (2D-RC). The portion (a) of FIG. 20 shows the state before the real symbols (components) of 2D-RC are mapped to the complex cells.

As shown in the portion (b) of FIG. 20, the Q-delay insertion unit 551 maps D=2 components of each 2D-RC onto the real component and the imaginary component of a D/2=1 complex cell. Then, as shown in the portion (c) of FIG. 20, the Q-delay insertion unit 551 cyclically delays the imaginary component of each complex cell by a D/2=1 complex cell.

FIG. 21 shows examples of the processing performed by the Q-delay insertion unit 551 shown in FIG. 19 for four-dimensional rotated constellation blocks (4D-RC). The portion (a) of FIG. 21 shows the state before the components of 4D-RC are mapped to the complex cells.

As shown in the portion (b) of FIG. 21, the Q-delay insertion unit 551 maps D=4 components of each 4D-RC onto the real components and the imaginary components of D/2=2 contiguous complex cells. Then, as shown in the portion (c) of FIG. 21, the Q-delay insertion unit 551 cyclically delays the imaginary component of each complex cell by D/2=2 complex cells.

The cell interleaver 555 in the RC component separation unit 550 permutes (shuffles) the $N_C$ complex cells obtained as a result of the Q-delay. In the DVB-T2 standard, the cell permutation applied by the cell interleaver 555 is a pseudo-random permutation generated using a linear feedback shift register (LFSR). In the DVB-T2 standard, the cell permutation applied by the cell interleaver 555 is different for each FEC block.

In order to increase the diversity of the system, the time/frequency interleaver 560 performs time interleaving and frequency interleaving to spread the complex cells of each FEC block in time and frequency. According to the DVB-T2 standard, the time interleaving and the frequency interleaving are performed by two different blocks.

The OFDM modulator 570 uses orthogonal frequency-division multiplexing (OFDM) modulation. An up-converter (not shown) converts a digital baseband signal into an analog radio-frequency (RF) signal. The RF power amplifier 580 amplifies the power of the analog RF signal. The analog RF signal whose power has been amplified is then transmitted from the transmit antenna 590.

Figure 22:
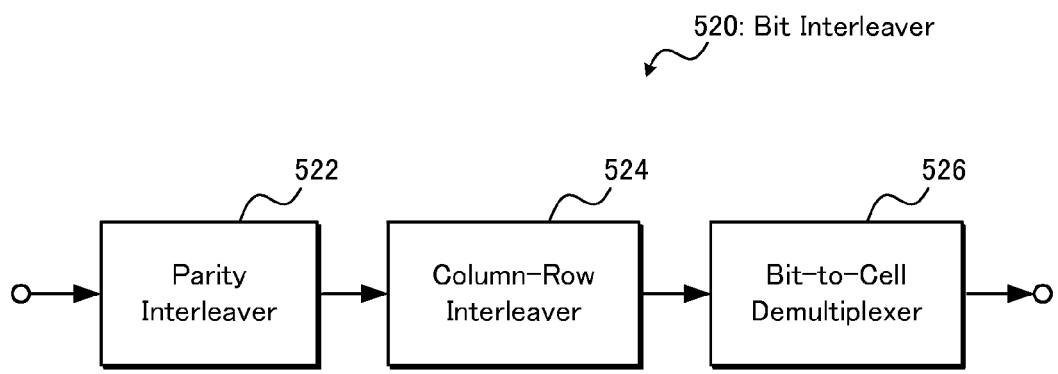
FIG. 22 is a block diagram showing the structure of a bit interleaver 520 shown in FIG. 19.
Figure 23:
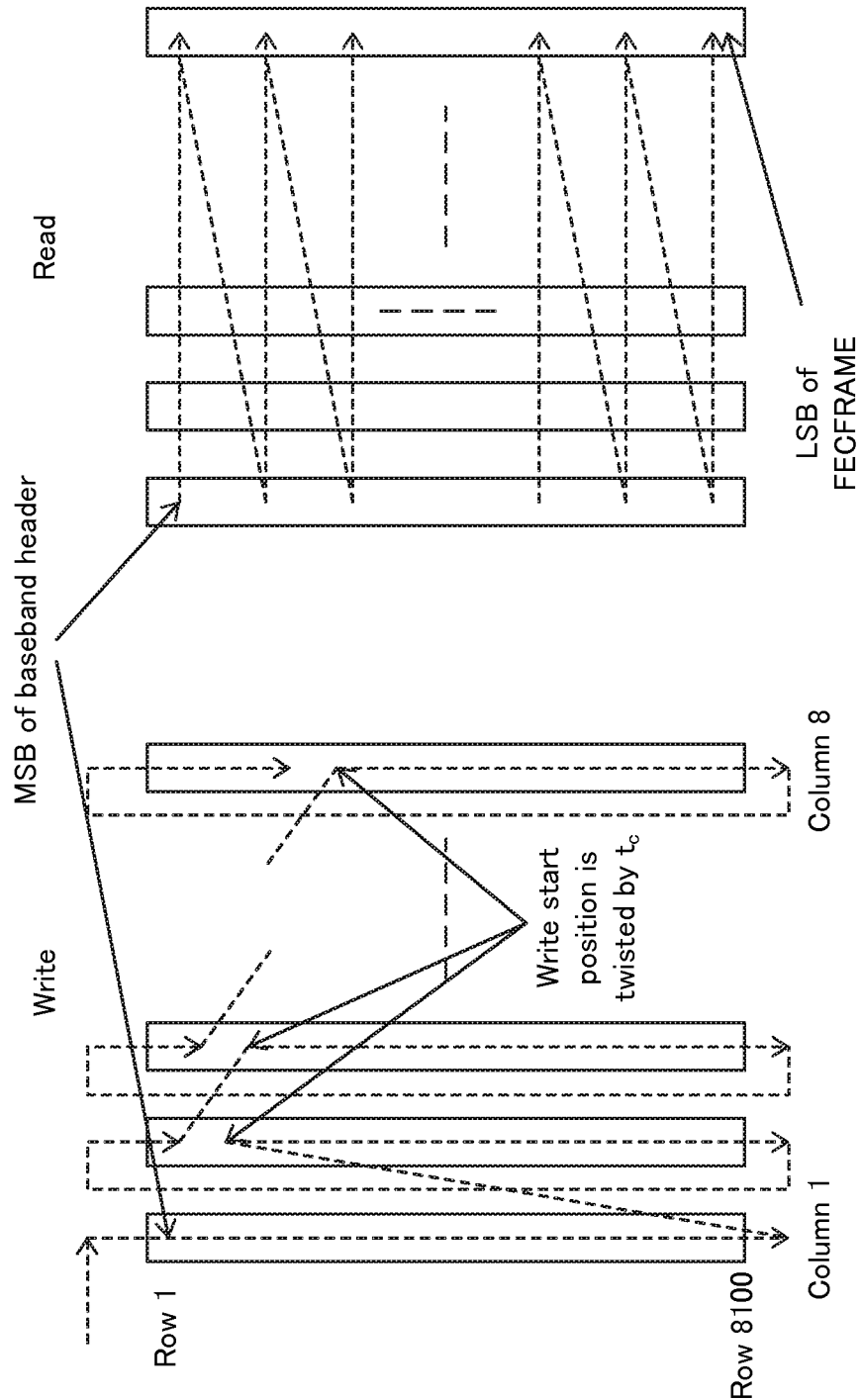
FIG. 23 shows the outline of an operation by a column-row interleaver 524 shown in FIG. 22.

The following describes details of the bit interleaver 520 shown in FIG. 19, with reference to FIGS. 22 and 23.

FIG. 22 is a block diagram showing the structure of the bit interleaver 520 of FIG. 19.

The bit interleaver 520 according to the DVB-T2 standard includes a parity interleaver 522, a column-row interleaver 524, and a bit-to-cell demultiplexer 526.

The parity interleaver 522 interleaves the parity bits of the systematic LDPC codeword obtained as a result of the encoding processing by the FEC encoder 510.

The column-row interleaver 524 interleaves the bits of systematic LDPC codeword whose parity bits have been interleaved by the parity interleaver 522.

Subsequently, the bit-to-cell demultiplexer 526 demultiplexes the bits of the systematic LDPC codeword which have been interleaved by the column-row interleaver 524 to cell words prior to the mapping to a QAM constellation. The demultiplexing includes processing equivalent to the permutation of the columns of an interleaver matrix of the column-row interleaver 524.

The column-row interleaver 524 and the associated bit-to-cell demultiplexer 526 are used only for higher-order constellations, such as 16-QAM constellations, 64-QAM constellations, and 256-QAM constellations. For QPSK (4-QAM) constellations, only the parity interleaver 522 is used.

The following describes the outline of the operation of the column-row interleaver 524 according to the DVB-T2 standard in FIG. 22. The description is provided with use of FIG. 23. In FIG. 23, a write order in which to write data bits to an interleaver matrix and a read order in which to read the data bits from the interleaver matrix are indicated by dotted lines.

The column-row interleaver 524 serially writes the data bits received from the parity interleaver 522 (the bits of a FEC codeword whose parity bits have been interleaved) column by column into an interleaver matrix, while twisting the write start position of each column by a specified number of bits. Also, the column-row interleaver 524 serially reads the data bits written in the interleaver matrix row by row. The first bit (the most significant bit (MSB) of a baseband header) of the FEC codeword (FEC frame) is written first in the interleaver matrix and read first from the interleaver matrix. Note that the "LSB of FECFRAME" in FIG. 23 indicates the least significant bit (LSB) of the FEC codeword (FEC frame) after the column-row interleaving.

The number of columns in the column-row interleaver is equal to the number of bits encoded onto a complex QAM symbol, i.e., 2×B, or to twice this number (2×2×B).

Figure 24A:
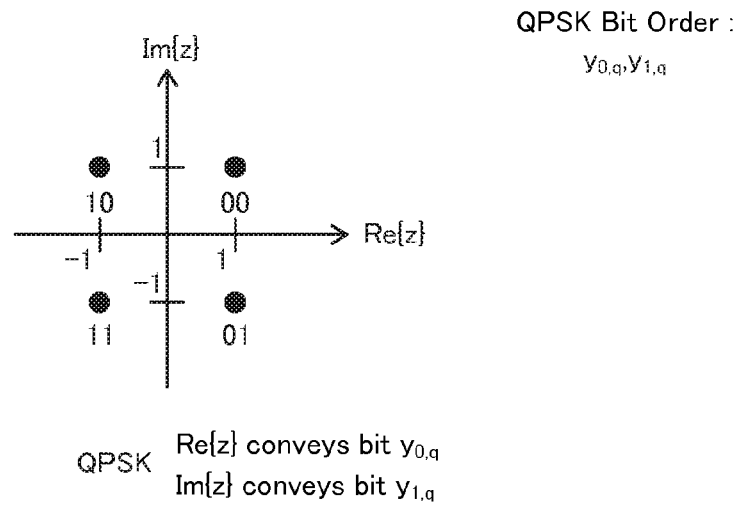
FIG. 24A shows bit mapping for a QPSK constellation.
Figure 24B:
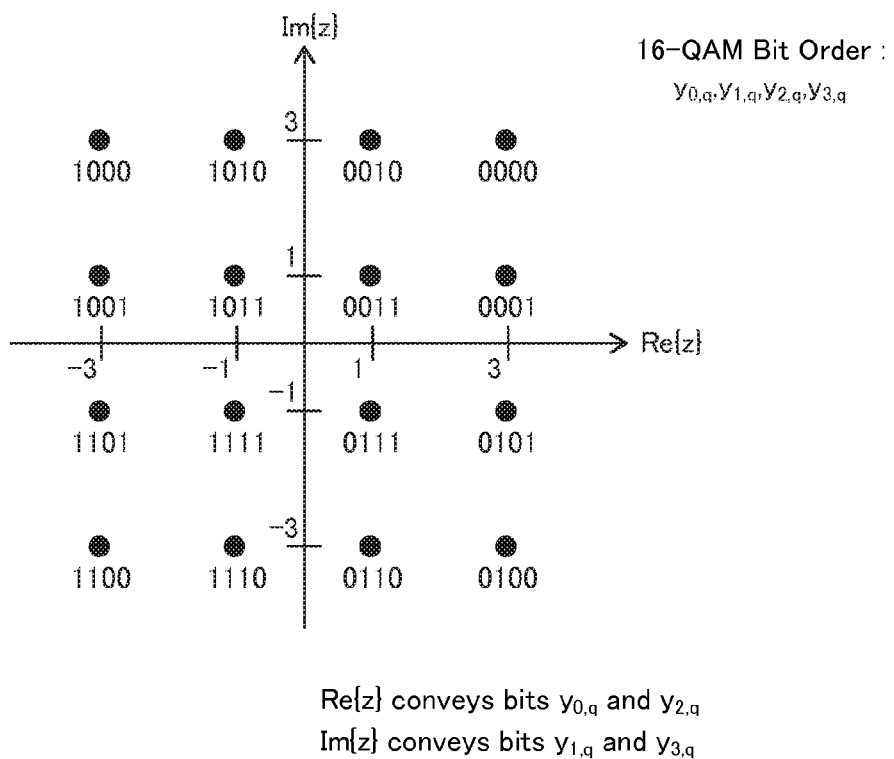
FIG. 24B shows bit mapping for a 16-QAM constellation.

Each cell word includes the same number of bits as the bits encoded onto one complex QAM symbol, i.e., 2×B bits. For example, the number of bits of each cell word is two for a QPSK (4-QAM) symbol, four for a 16-QAM symbol, six for a 64-QAM symbol, and eight for a 256-QAM symbol. Each cell word is modulated by the QAM mapper 530 with use of a particular mapping constellation, such as QPSK (4-QAM), 16-QAM, 64-QAM or 256-QAM. The constellations and the details of Gray mapping applied to the bits according to the DVB-T2 standard are illustrated in FIGS. 24A, 24B, and 24C for QPSK (4-QAM), 16-QAM, and 64-QAM, respectively.

The inventor has realized that the cell interleaver 555 in the DVB-T2 standard includes two distinct functions.

One of the functions (hereinafter "first function") is to spread the burst errors that occur in the channel as irregularly as possible throughout a FEC block. This function is performed very well by the pseudo-random permutation by the cell interleaver 555 in the DVB-T2 standard, and is applicable to both rotated and non-rotated constellations.

The other one of the functions (hereinafter "second function"), which is achieved in conjunction with the time/frequency interleaver, is to spread the rotated constellation components over time and frequency. This function is of course relevant only for rotated constellations. However, the pseudo-random permutation by the cell interleaver 555 as used in the DVB-T2 standard achieves a sub-optimal separation of the D real symbols of each D-dimensional rotated constellation block in time and frequency. This results in sub-optimal performance in fading or erasure channels.

The separation of the D real symbols of each D-dimensional rotated constellation block can be achieved by replacing the cell interleaver 555 that applies the pseudo-random permutation according to the DVB-T2 standard with an interleaver that is specifically optimized for separating the D real symbols as far as possible in time and frequency. However, such interleavers have regular structures, which make them sub-optimal with respect to the first function.

17
Embodiment 2

A transmitter, a transmission method, a receiver, and a reception method according to Embodiment 2 of the present invention are based on the <<Further Examination and Further Discovery by the Inventor>> above, and are described below with reference to the drawings.

<Transmitter and Transmission Method>

Figure 25:
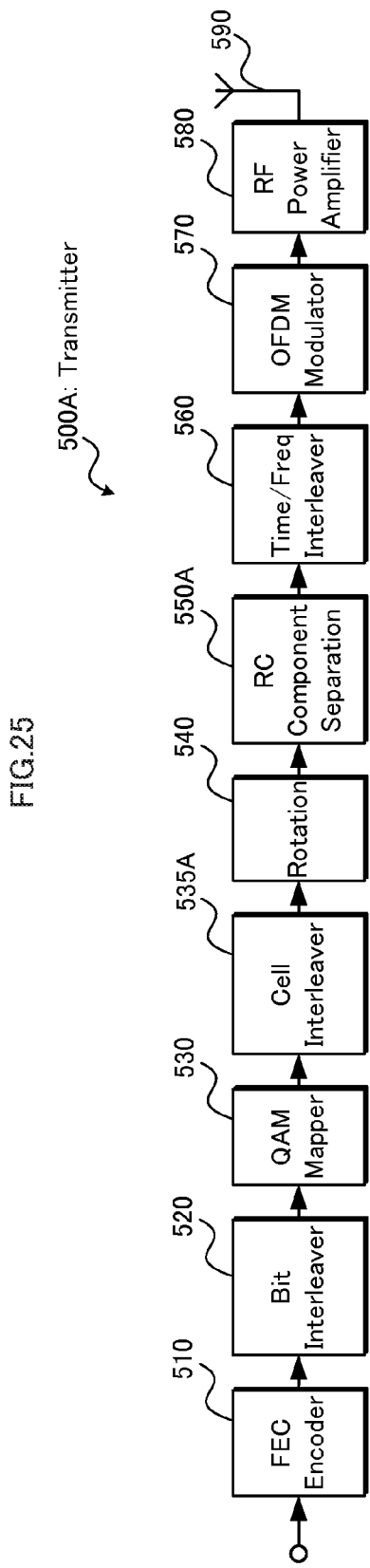
FIG. 25 is a block diagram showing the structure of a transmitter 500A that employs rotated constellations according to Embodiment 2 of the present invention.

FIG. 25 is a block diagram showing the structure of a transmitter 500A according to Embodiment 2 of the present invention. In Embodiment 2, the same reference signs are used and a description is omitted for constituent elements to which applies the description of the constituent elements of the transmitter 500 in FIG. 19 as described in the section <<Further Examination and Further Discovery by the Inventor>> above.

The transmitter 500A is basically the same as the transmitter 500 except that a cell interleaver 535A is arranged between the QAM mapper 530 and the constellation rotation unit 540, and that the RC component separation unit 550 is replaced with an RC component separation unit 550A which differs from the RC component separation unit 550 in terms of processing.

The cell interleaver 535A achieves the first function of spreading the burst errors that occur in the channel as irregularly as possible throughout a FEC block. The cell interleaver 535A permutes complex QAM symbols (i.e., groups of two real-valued PAM symbols) output from the QAM mapper 530, which are complex QAM symbols prior to being subjected to the rotation processing by the constellation rotation unit 540. A pseudo-random permutation is suitable as the permutation by the cell interleaver 535A to realize the first function. In other words, a pseudo-random interleaver such as the cell interleaver 555 according to the DVB-T2 standard is suitable as the cell interleaver 535A.

Figure 26:
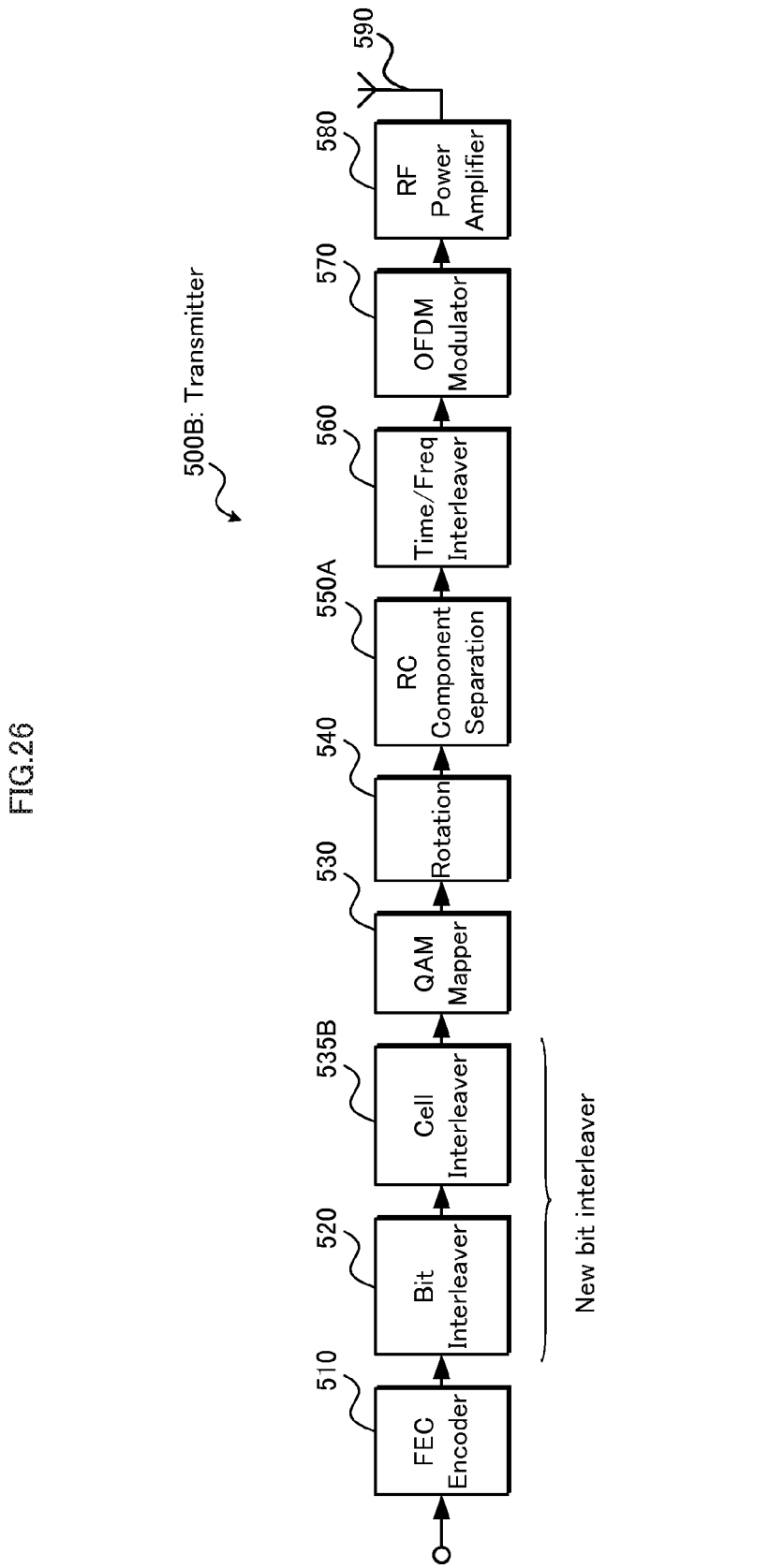
FIG. 26 is a block diagram showing the structure of a transmitter 500B that employs rotated constellations according to Embodiment 2 of the present invention.

The permutation by the cell interleaver 535A is directly applied to the QAM symbols produced by the QAM mapper 530. Accordingly, as shown in FIG. 26, a cell interleaver 535B may be arranged upstream of the QAM mapper 530, instead of the cell interleaver 535A arranged downstream of the QAM mapper 530. The cell interleaver 535B of a transmitter 500B, which is shown in FIG. 26, interleaves groups of 2×B bits instead of interleaving QAM symbols. Each group modulates one QAM symbol. Note that a combination of the bit interleaver 520 and the cell interleaver 535B may be regarded as a new bit interleaver.

The RC component separation unit 550A is arranged downstream of the constellation rotation unit 540, and achieves the second function of spreading the components of rotated constellation blocks.

The RC component separation unit 550A performs the same processing performed by the cell mapper 140A and the cell interleaver 150A in the transmitter 100A according to Embodiment 1. A detailed description of the RC component separation unit 550A is omitted here, since the description of the cell mapper 140A and the cell interleaver 150A of Embodiment 1 is applicable as the description of the RC component separation unit 550A.

A FEC block permutated by the RC component separation unit 550A is mapped onto one or more frames in sequential order, and/or onto one or more channels or frequencies. This step is performed by the time/frequency interleaver 560. If the FEC block is spread over $N_F > 1$ frames, the FEC block is first divided into $N_F$ contiguous slices, and each slice is mapped onto exactly one of the $N_F$ frames. The FEC block is divided into $N_F$ slices in such a manner that the difference in size between the $N_F$ slices is one complex cell at a maximum. Preferably, the $N_F$ slices are of equal size in order to ensure optimum time diversity.

<Receiver and Reception Method>

Figure 27:
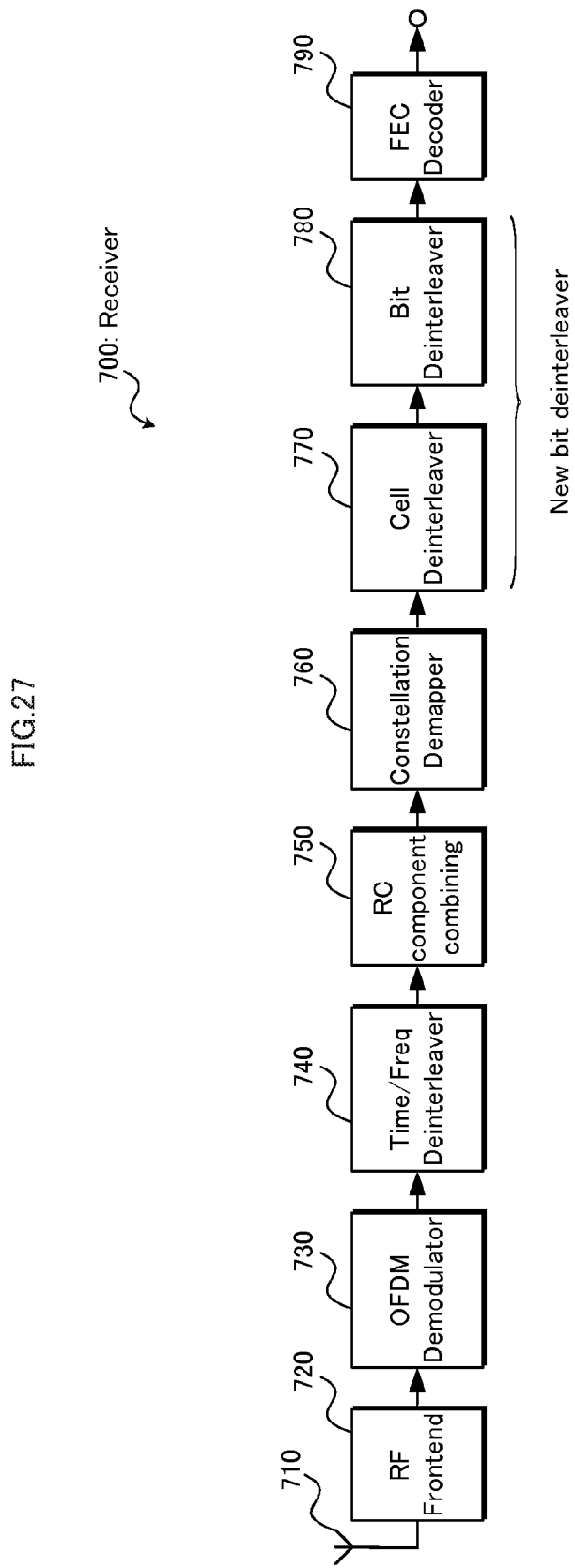
FIG. 27 is a block diagram showing the structure of a receiver 700 that employs rotated constellations according to Embodiment 2 of the present invention.

FIG. 27 is a block diagram showing the structure of a receiver 700 according to Embodiment 2 of the present invention. The receiver 700 shown in FIG. 27 corresponds to the transmitter 500A shown in FIG. 25 or the transmitter 500B shown in FIG. 26, and mirrors the functionality of the transmitter 500A or the transmitter 500B.

The receiver 700 includes a receive antenna 710, a radio-frequency (RF) frontend 720, an OFDM demodulator 730, a time/frequency deinterleaver 740, an RC component combining unit 750, a constellation demapper 760, a cell deinterleaver 770, a bit deinterleaver 780, and a FEC decoder 790. Note that a combination of the cell deinterleaver 770 and the bit deinterleaver 780 may be regarded as a new bit deinterleaver.

A signal received by the receive antenna 710 is input to the RF frontend 720. The RF frontend 720 typically includes a tuner (not shown) for tuning into a desired channel, and a down-converter (not shown) for converting an analog RF signal into a digital baseband signal.

The OFDM demodulator 730 demodulates a digital baseband signal. In other words, the OFDM demodulator 730 calculates channel fading coefficients based on the digital baseband signal and calculates complex symbols (complex cells) based on the calculated channel fading coefficients. Then, the OFDM demodulator 730 outputs a stream of complex cells to the time/frequency deinterleaver 740.

The time/frequency deinterleaver 740 extracts, from the frame (stream), complex cells belonging to a desired service or program according to a schedule notified by the transmitter. The time/frequency deinterleaver 740 deinterleaves (time/frame deinterleaving) the extracted complex cells so as to return the complex cells to the order before interleaving by the time/frequency interleaver 560 of the transmitter 500A or the transmitter 500B. The time/frequency deinterleaver 740 outputs a plurality of FEC blocks each consisting of a plurality of complex cells.

The RC component combining unit 750 extracts D real symbols of each of $N_S/D$ D-dimensional constellation blocks that have been separated by the RC component separation unit 550A of the transmitter 500A or the transmitter 500B. Here, the extraction is based on the processing of the RC component separation unit 550A of the transmitter 500A or the transmitter 500B. Then, the RC component combining unit 750 combines the D real symbols thus extracted into D/2 contiguous complex cells.

The constellation demapper 760 sequentially demodulates the $N_S/D$ D-dimensional constellation blocks. For example, the constellation demapper 760 jointly demodulates the D real symbols of each D-dimensional constellation block, and produces D×B "soft" bits for each D-dimensional constellation block. Note that in one processing step, the constellation demapper 760 performs derotation corresponding to the rotation by the constellation rotation unit 540 of the transmitter 500A or the transmitter 500B and demapping corresponding to the mapping by the QAM mapper 530.

In order to cancel group interleaving for a group made up of two real-valued symbols, which is performed by the cell interleaver 535A of the transmitter 500A, or to cancel group interleaving for a group made up of 2×B bits, which is performed by the cell interleaver 535B of the transmitter 500B shown in FIG. 26, the cell deinterleaver 770 deinterleaves groups of 2×B "soft" bits output from the constellation demapper 760 (cell deinterleaving).

The bit deinterleaver 780 deinterleaves the groups of bits output from the cell deinterleaver 770 so as to return the groups of bits to the order before interleaving by the bit interleaver 520 of the transmitter 500A or the transmitter 500B (bit deinterleaving).

The FEC decoder 790 decodes the soft bits of each FEC block in accordance with the FEC code used by the FEC encoder 510 of the transmitter 500A or the transmitter 500B, and provides the results of decoding to subsequent processing blocks for further processing.

<<Supplementary Explanation (Part 1)>>

The present invention is not limited to the above-described embodiments, but rather may be embodied in a variety of ways, such as those described below, for achieving the aim of the present invention or other aims related or associated thereto. For example, the following modifications are possible.

(1) In Embodiments 1 and 2 above, a FEC code has been provided as an example of an error correction code, but the transmission technology and reception technology of Embodiments 1 and 2 may be applied to error correction codes other than a FEC code.

(2) The above embodiments may be implemented using hardware and software. The above embodiments may be implemented or executed with a computing device (processor). The computing device or processor may, for example, be a main processor/general-purpose processor, a digital signal processor (DSP), an application specific integrated circuit (ASIC), a field programmable gate array (FPGA), or another programmable logical device. The above embodiments may be executed or implemented as a combination of these devices.

(3) The above embodiments may be implemented by a combination of software modules that are executed by a processor or directly by hardware. A combination of software modules and hardware implementation is also possible. The software modules may be stored on a variety of computer-readable storage media, such as a RAM, EPROM, EEPROM, flash memory, register, hard disk, CD-ROM, DVD, and the like.

<<Supplementary Explanation (Part 2)>>

The following summarizes a transmission method, a transmitter, a reception method, and a receiver according to the embodiments, as well as the effects thereof.

A first transmission method is for a transmission method for transmitting digital data, comprising: encoding a block of data of a predetermined length with an error correction code; generating a real-valued symbol sequence including $N_S$ real-valued symbols by mapping the encoded block of data onto real-valued symbols a predetermined number of bits at a time; converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and generating a complex symbol sequence from $N_S$ real symbols resulting from the conversion, the complex symbol sequence including $N_C=N_S/2$ complex symbols, wherein the complex symbol sequence is generated such that a distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

A second transmission method is for transmitting digital data, comprising: encoding a block of data of a predetermined length with an error correction code; generating a real-valued symbol sequence including $N_S$ real-valued symbols by mapping the encoded block of data onto real-valued symbols a predetermined number of bits at a time; converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and generating a complex symbol sequence from $N_S$ real symbols resulting from the conversion, the complex symbol sequence including $N_C=N_S/2$ complex symbols, wherein the complex symbol sequence is generated by: mapping the D real symbols of each D-dimensional rotated vector onto D contiguous complex symbols, and thereby generating a first complex symbol sequence including the $N_C$ complex symbols from the $N_S$ real symbols resulting from the conversion; and performing processing equivalent to writing the $N_C$ complex symbols in the first complex symbol sequence column by column into an interleaver matrix having D rows, and to reading the $N_C$ complex symbols row by row from the interleaver matrix.

A third transmission method is for transmitting digital data, comprising: encoding a block of data of a predetermined length with an error correction code; generating a real-valued symbol sequence including $N_S$ real-valued symbols by mapping the encoded block of data onto real-valued symbols a predetermined number of bits at a time; converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and generating a complex symbol sequence from $N_S$ real symbols resulting from the conversion, the complex symbol sequence including $N_C=N_S/2$ complex symbols, wherein the complex symbol sequence is generated by: mapping the D real symbols of each D-dimensional rotated vector onto D/2 contiguous complex symbols, and thereby generating a first complex symbol sequence including $N_C$ first complex symbols from the $N_S$ real symbols resulting from the conversion; generating a second complex symbol sequence including the $N_C$ complex symbols by inserting a delay of D/2 symbols with a predetermined period between a real component and an imaginary component of each of the $N_C$ first complex symbols in the first complex symbol sequence; and performing processing equivalent to writing the $N_C$ complex symbols in the second complex symbol sequence column by column into an interleaver matrix having D rows, and to reading the $N_C$ complex symbols row by row from the interleaver matrix.

A first transmitter is for transmitting digital data, comprising: an encoder encoding a block of data of a predetermined length with an error correction code; a real-valued symbol sequence generator generating a real-valued symbol sequence including $N_S$ real-valued symbols by mapping the encoded block of data onto real-valued symbols a predetermined number of bits at a time; a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and a complex symbol sequence generator generating a complex symbol sequence from $N_S$ real symbols resulting from the conversion, the complex symbol sequence including $N_C=N_S/2$ complex symbols, wherein the complex symbol sequence generator generates the complex symbol sequence such that a distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

A second transmitter is for transmitting digital data, comprising: an encoder encoding a block of data of a predetermined length with an error correction code; a real-valued symbol sequence generator generating a real-valued symbol sequence including $N_S$ real-valued symbols by mapping the encoded block of data onto real-valued symbols a predetermined number of bits at a time; a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and a complex symbol sequence generator generating a complex symbol sequence from $N_S$ real symbols resulting from the conversion, the complex symbol sequence including $N_C=N_S/2$ complex symbols, wherein the complex symbol sequence generator generates the complex symbol sequence: mapping the D real symbols of each D-dimensional rotated vector onto D contiguous complex symbols, and thereby generating a first complex symbol sequence including the $N_C$ complex symbols from the $N_S$ real symbols resulting from the conversion; and performing processing equivalent to writing the $N_C$ complex symbols in the first complex symbol sequence column by column into an interleaver matrix having D rows, and to reading the $N_C$ complex symbols row by row from the interleaver matrix.

A third transmitter is for transmitting digital data, comprising: an encoder encoding a block of data of a predetermined length with an error correction code; a real-valued symbol sequence generator generating a real-valued symbol sequence including $N_S$ real-valued symbols by mapping the encoded block of data onto real-valued symbols a predetermined number of bits at a time; a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and a complex symbol sequence generator generating a complex symbol sequence from $N_S$ real symbols resulting from the conversion, the complex symbol sequence including $N_C=N_S/2$ complex symbols, wherein the complex symbol sequence generator generates the complex symbol sequence by: mapping the D real symbols of each D-dimensional rotated vector onto D/2 contiguous complex symbols, and thereby generating a first complex symbol sequence including $N_C$ first complex symbols from the $N_S$ real symbols resulting from the conversion; generating a second complex symbol sequence including the $N_C$ complex symbols by inserting a delay of D/2 symbols with a predetermined period between a real component and an imaginary component of each of the $N_C$ first complex symbols in the first complex symbol sequence; and performing processing equivalent to writing the $N_C$ complex symbols in the second complex symbol sequence column by column into an interleaver matrix having D rows, and to reading the $N_C$ complex symbols row by row from the interleaver matrix.

The first, second, and third transmission methods and the first, second, and third transmission transmitters can spread D real symbols of a D-dimensional rotated constellation block so as to be even and to have a large minimum distance, thereby achieving excellent time diversity.

A fourth transmission method is any of the first, second, and third transmission methods, wherein the complex symbol sequence is divided into $N_F$ slices, and the $N_S/2$ complex symbols are mapped onto $N_F$ frames, so that all the complex symbols of each of the $N_F$ slices are mapped onto the same frame.

A fifth transmission method is the fourth transmission method, wherein the division of the complex symbol sequence is performed in a manner that a difference in the number of complex symbols included in each of the $N_F$ slices is one at a maximum.

The fourth and fifth transmission methods further improve time diversity.

A sixth transmission method is any of the first, second, and third transmission methods, further comprising interleaving groups that are each made up of two of the real-valued symbols in the real-valued symbol sequence, the interleaving being performed between the generation of the real-valued symbol sequence and the conversion of the D-dimensional vectors.

A fourth transmitter is any of the first, second, and third transmitters, further comprising an interleaver interleaving groups that are each made up of two of the real-valued symbols in the real-valued symbol sequence, the interleaver being provided between the real-valued symbol sequence generator and the converter.

The sixth transmission method and the fourth transmitter can spread the burst errors that occur in the channel, thereby improving robustness against the burst errors that occur in the channel.

A seventh transmission method is any of the first, second, and third transmission methods, wherein each of the real-valued symbols is obtained as a result of mapping of B bits, and the seventh transmission method further comprises interleaving groups of 2×B bits in a bit sequence including a plurality of bits of the encoded block of data, the interleaving being performed between the encoding of the block of data and the generation of the real-valued symbol sequence.

A fifth transmitter is any of the first, second, and third transmitters, wherein each of the real-valued symbols is obtained as a result of mapping of B bits, and the fifth transmitter further comprises an interleaver interleaving groups of 2×B bits in a bit sequence including a plurality of bits of the encoded block of data, the interleaver being provided between the encoder and the real-valued symbol sequence generator.

The seventh transmission method and the fifth transmitter can spread the burst errors that occur in the channel, thereby improving robustness against the burst errors that occur in the channel.

A first reception method is for receiving digital data comprising: receiving a complex symbol sequence including $N_C$ complex symbols obtained through any of the first, second, and third transmission methods; extracting, for each of $N_S/D$ D-dimensional rotated vectors, D real symbols of the D-dimensional rotated vector from the complex symbol sequence; generating an encoded block of data by sequentially demapping the $N_S/D$ D-dimensional rotated vectors; and decoding the encoded block of data by an error correction code.

A first receiver is for receiving digital data comprising: a receiving unit receiving a complex symbol sequence including $N_C$ complex symbols obtained by the transmitter of any of the first, second, and third transmitters; a real-valued symbol extractor extracting, for each of $N_S/D$ D-dimensional rotated vectors, D real symbols of the D-dimensional rotated vector from the complex symbol sequence; a demapper generating an encoded block of data by sequentially demapping the $N_S/D$ D-dimensional rotated vectors; and a decoder decoding the encoded block of data by an error correction code.

The first reception method and the first receiver can spread D real symbols of a D-dimensional rotated constellation block so as to be even and to have a large minimum distance, thereby achieving excellent time diversity.

A second reception method is for receiving digital data comprising: receiving a complex symbol sequence including $N_C$ complex symbols obtained through either of the sixth and seventh transmission methods; extracting, for each of $N_S/D$ D-dimensional rotated vectors, D real symbols of the D-dimensional rotated vector from the complex symbol sequence; generating an encoded block of data by sequentially demapping the $N_S/D$ D-dimensional rotated vectors; deinterleaving a plurality of bits of the encoded block of data based on the interleaving of the groups; and decoding the encoded block of data that has been deinterleaved, with use of an error correction code.

A second receiver is for receiving digital data comprising: a receiving unit receiving a complex symbol sequence including $N_C$ complex symbols obtained by either of the fourth and fifth transmitters; a real-valued symbol extractor extracting, for each of $N_S/D$ D-dimensional rotated vectors, D real symbols of the D-dimensional rotated vector from the complex symbol sequence; a demapper generating an encoded block of data by sequentially demapping the $N_S/D$ D-dimensional rotated vectors; a deinterleaver deinterleaving a plurality of bits of the encoded block of data based on the interleaving of the groups by the interleaver; and a decoder decoding the encoded block of data that has been deinterleaved, with use of an error correction code.

The second reception method and the second receiver can spread D real symbols of a D-dimensional rotated constellation block so as to be even and to have a large minimum distance, thereby achieving excellent time diversity and improving robustness against the burst errors that occur in the channel.

INDUSTRIAL APPLICABILITY

The present invention is applicable to communications using rotated constellations.

REFERENCE SIGNS LIST 100A transmitter
110 FEC encoder
115 demultiplexer
120 PAM mapper
125 demultiplexer
130 constellation rotation unit
140 cell mapper
150a cell interleaver
160a frame interleaver
170a frame mapper
180 modulator
190 transmit antenna
300 receiver
310 receive antenna
320 demodulator
330 frame demapper
340 frame deinterleaver
350 cell deinterleaver
360 cell demapper
370 constellation demapper
380 FEC decoder
500A, 500B transmitter
510 FEC encoder
520 bit interleaver
520 QAM mapper
535A, 535B cell interleaver
540 constellation rotation unit
550A RC component separation unit
560 time/frequency interleaver
570 OFDM modulator
580 RF power amplifier
590 transmit antenna
700 receiver
710 receive antenna
720 RF frontend
730 OFDM demodulator
740 time/frequency deinterleaver
750 RC component combining unit
760 constellation demapper
770 cell deinterleaver
780 bit deinterleaver
790 FEC decoder

The invention claimed is:

1. A transmission method for transmitting digital data, comprising:
   encoding a block of data of a predetermined length with an error correction code;
   generating a real-valued symbol sequence including $N_S$ real-valued symbols by mapping the encoded block of data onto real-valued symbols a predetermined number of bits at a time;
   converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
   generating a complex symbol sequence from $N_S$ real symbols resulting from the conversion, the complex symbol sequence including $N_C=N_S/2$ complex symbols, wherein
   the complex symbol sequence is generated such that a distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

2. The transmission method of claim 1, wherein
the complex symbol sequence is divided into $N_F$ slices, and the $N_S/2$ complex symbols are mapped onto $N_F$ frames, so that all the complex symbols of each of the $N_F$ slices are mapped onto the same frame.

3. The transmission method of claim 2, wherein
the division of the complex symbol sequence is performed in a manner that a difference in the number of complex symbols included in each of the $N_F$ slices is one at a maximum.

4. The transmission method of claim 1, further comprising interleaving groups that are each made up of two of the real-valued symbols in the real-valued symbol sequence, the interleaving being performed between the generation of the real-valued symbol sequence and the conversion of the D-dimensional vectors.

5. A reception method for receiving digital data comprising:
receiving a complex symbol sequence including $N_C$ complex symbols obtained through the transmission method of claim 4;
extracting, for each of $N_S/D$ D-dimensional rotated vectors, D real symbols of the D-dimensional rotated vector from the complex symbol sequence;
generating an encoded block of data by sequentially demapping the $N_S/D$ D-dimensional rotated vectors;
deinterleaving a plurality of bits of the encoded block of data based on the interleaving of the groups; and
decoding the encoded block of data that has been deinterleaved, with use of an error correction code.

6. The transmission method of claim 1, wherein
each of the real-valued symbols is obtained as a result of mapping of B bits, and
the transmission method further comprises interleaving groups of 2×B bits in a bit sequence including a plurality of bits of the encoded block of data, the interleaving being performed between the encoding of the block of data and the generation of the real-valued symbol sequence.

7. A reception method for receiving digital data comprising:
receiving a complex symbol sequence including $N_C$ complex symbols obtained through the transmission method of claim 1;
extracting, for each of $N_S/D$ D-dimensional rotated vectors, D real symbols of the D-dimensional rotated vector from the complex symbol sequence;
generating an encoded block of data by sequentially demapping the $N_S/D$ D-dimensional rotated vectors; and
decoding the encoded block of data by an error correction code.

8. A transmission method for transmitting digital data, comprising:
encoding a block of data of a predetermined length with an error correction code;
generating a real-valued symbol sequence including $N_S$ real-valued symbols by mapping the encoded block of data onto real-valued symbols a predetermined number of bits at a time;
converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
generating a complex symbol sequence from $N_S$ real symbols resulting from the conversion, the complex symbol sequence including $N_C=N_S/2$ complex symbols, wherein
the complex symbol sequence is generated by:
mapping the D real symbols of each D-dimensional rotated vector onto D contiguous complex symbols, and thereby generating a first complex symbol sequence including the $N_C$ complex symbols from the $N_S$ real symbols resulting from the conversion; and
performing processing equivalent to writing the $N_C$ complex symbols in the first complex symbol sequence column by column into an interleaver matrix having D rows, and to reading the $N_C$ complex symbols row by row from the interleaver matrix.

9. A transmission method for transmitting digital data, comprising:
encoding a block of data of a predetermined length with an error correction code;
generating a real-valued symbol sequence including $N_S$ real-valued symbols by mapping the encoded block of data onto real-valued symbols a predetermined number of bits at a time;
converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
generating a complex symbol sequence from $N_S$ real symbols resulting from the conversion, the complex symbol sequence including $N_C=N_S/2$ complex symbols, wherein
the complex symbol sequence is generated by:
mapping the D real symbols of each D-dimensional rotated vector onto D/2 contiguous complex symbols, and thereby generating a first complex symbol sequence including $N_C$ first complex symbols from the $N_S$ real symbols resulting from the conversion;
generating a second complex symbol sequence including the $N_C$ complex symbols by inserting a delay of D/2 symbols with a predetermined period between a real component and an imaginary component of each of the $N_C$ first complex symbols in the first complex symbol sequence; and
performing processing equivalent to writing the $N_C$ complex symbols in the second complex symbol sequence column by column into an interleaver matrix having D rows, and to reading the $N_C$ complex symbols row by row from the interleaver matrix.

10. A transmitter for transmitting digital data, comprising:
an encoder encoding a block of data of a predetermined length with an error correction code;
a real-valued symbol sequence generator generating a real-valued symbol sequence including $N_S$ real-valued symbols by mapping the encoded block of data onto real-valued symbols a predetermined number of bits at a time;
a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
a complex symbol sequence generator generating a complex symbol sequence from $N_S$ real symbols resulting from the conversion, the complex symbol sequence including $N_C=N_S/2$ complex symbols, wherein
the complex symbol sequence generator generates the complex symbol sequence such that a distance between any two of the D real symbols of each of the D-dimensional rotated vectors is $N_C/D$ complex symbols or $N_C/D-1$ complex symbols, or such that the distance between any two of the D real symbols of each of the D-dimensional rotated vectors, except for part of the D-dimensional rotated vectors, is $N_C/D$ complex symbols or $N_C/D-1$ complex symbols.

11. The transmitter of claim 10, further comprising
an interleaver interleaving groups that are each made up of two of the real-valued symbols in the real-valued symbol sequence, the interleaver being provided between the real-valued symbol sequence generator and the converter.

12. A receiver for receiving digital data comprising:
a receiving unit receiving a complex symbol sequence including $N_C$ complex symbols obtained by the transmitter of claim 11;
a real-valued symbol extractor extracting, for each of $N_S/D$ D-dimensional rotated vectors, D real symbols of the D-dimensional rotated vector from the complex symbol sequence;
a demapper generating an encoded block of data by sequentially demapping the $N_S/D$ D-dimensional rotated vectors;
a deinterleaver deinterleaving a plurality of bits of the encoded block of data based on the interleaving of the groups by the interleaver; and
a decoder decoding the encoded block of data that has been deinterleaved, with use of an error correction code.

13. The transmitter of claim 10, wherein
each of the real-valued symbols is obtained as a result of mapping of B bits, and
the transmitter further comprises an interleaver interleaving groups of 2×B bits in a bit sequence including a plurality of bits of the encoded block of data, the interleaver being provided between the encoder and the real-valued symbol sequence generator.

14. A receiver for receiving digital data comprising:
a receiving unit receiving a complex symbol sequence including $N_C$ complex symbols obtained by the transmitter of claim 10;
a real-valued symbol extractor extracting, for each of $N_S/D$ D-dimensional rotated vectors, D real symbols of the D-dimensional rotated vector from the complex symbol sequence;
a demapper generating an encoded block of data by sequentially demapping the $N_S/D$ D-dimensional rotated vectors; and
a decoder decoding the encoded block of data by an error correction code.

15. A transmitter for transmitting digital data, comprising:
an encoder encoding a block of data of a predetermined length with an error correction code;
a real-valued symbol sequence generator generating a real-valued symbol sequence including $N_S$ real-valued symbols by mapping the encoded block of data onto real-valued symbols a predetermined number of bits at a time;
a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
a complex symbol sequence generator generating a complex symbol sequence from $N_S$ real symbols resulting from the conversion, the complex symbol sequence including $N_C=N_S/2$ complex symbols, wherein
the complex symbol sequence generator generates the complex symbol sequence by:
mapping the D real symbols of each D-dimensional rotated vector onto D contiguous complex symbols, and thereby generating a first complex symbol sequence including the $N_C$ complex symbols from the $N_S$ real symbols resulting from the conversion; and
performing processing equivalent to writing the $N_C$ complex symbols in the first complex symbol sequence column by column into an interleaver matrix having D rows, and to reading the $N_C$ complex symbols row by row from the interleaver matrix.

16. A transmitter for transmitting digital data, comprising:
an encoder encoding a block of data of a predetermined length with an error correction code;
a real-valued symbol sequence generator generating a real-valued symbol sequence including $N_S$ real-valued symbols by mapping the encoded block of data onto real-valued symbols a predetermined number of bits at a time;
a converter converting D-dimensional vectors into D-dimensional rotated vectors by multiplying each of the D-dimensional vectors by a D×D orthogonal matrix, each of the D-dimensional vectors having D of the real-valued symbols in the real-valued symbol sequence as elements, each of the D-dimensional rotated vectors having D real symbols as elements; and
a complex symbol sequence generator generating a complex symbol sequence from $N_S$ real symbols resulting from the conversion, the complex symbol sequence including $N_C=N_S/2$ complex symbols, wherein
the complex symbol sequence generator generates the complex symbol sequence by:
mapping the D real symbols of each D-dimensional rotated vector onto D/2 contiguous complex symbols, and thereby generating a first complex symbol sequence including $N_C$ first complex symbols from the $N_S$ real symbols resulting from the conversion;
generating a second complex symbol sequence including the $N_C$ complex symbols by inserting a delay of D/2 symbols with a predetermined period between a real component and an imaginary component of each of the $N_C$ first complex symbols in the first complex symbol sequence; and
performing processing equivalent to writing the $N_C$ complex symbols in the second complex symbol sequence column by column into an interleaver matrix having D rows, and to reading the $N_C$ complex symbols row by row from the interleaver matrix.

* * * * *